(12) United States Patent
Roets

(10) Patent No.: US 10,135,607 B1
(45) Date of Patent: Nov. 20, 2018

(54) DISTRIBUTED LEDGER INTERACTION SYSTEMS AND METHODS

(71) Applicant: DRAGONCHAIN, INC., Bellevue, WA (US)

(72) Inventor: Joe Roets, Bellevue, WA (US)

(73) Assignee: DRAGONCHAIN, INC., Bellevue, WA (US)

(*) Notice: Subject to any disclaimer, the term of this patent is extended or adjusted under 35 U.S.C. 154(b) by 0 days.

(21) Appl. No.: 16/101,343

(22) Filed: Aug. 10, 2018

Related U.S. Application Data

(60) Provisional application No. 62/544,218, filed on Aug. 11, 2017.

(51) Int. Cl.
*H04L 29/06* (2006.01)
*H04L 9/06* (2006.01)
*H04L 9/32* (2006.01)
*G06F 21/64* (2013.01)
*G06Q 20/36* (2012.01)
*G06F 17/30* (2006.01)

(52) U.S. Cl.
CPC ............ *H04L 9/0637* (2013.01); *G06F 21/64* (2013.01); *G06Q 20/36* (2013.01); *H04L 9/3213* (2013.01); *G06F 17/30283* (2013.01); *H04L 2209/38* (2013.01)

(58) Field of Classification Search
CPC ........................ H04L 2209/38; H04L 2209/56; G06F 21/602
See application file for complete search history.

(56) References Cited

U.S. PATENT DOCUMENTS

| | | | |
|---|---|---|---|
| 9,569,439 | B2 | 2/2017 | Davis et al. |
| 9,569,771 | B2 | 2/2017 | Lesavich et al. |
| 9,646,029 | B1 | 5/2017 | Baird |
| 9,672,499 | B2 | 6/2017 | Yang et al. |
| 9,747,586 | B1 | 8/2017 | Frolov et al. |
| 2010/0332336 | A9 | 12/2010 | Quigley et al. |
| 2012/0020476 | A1 | 1/2012 | Billet et al. |
| 2012/0095908 | A1 | 4/2012 | Barrie et al. |
| 2013/0061288 | A1 | 3/2013 | Paim |
| 2016/0260095 | A1 | 9/2016 | Ford |
| 2017/0011460 | A1* | 1/2017 | Molinari ................ G06Q 40/04 |
| 2017/0048235 | A1* | 2/2017 | Lohe .................... G06Q 20/065 |
| 2017/0091756 | A1* | 3/2017 | Stern ..................... H04L 9/3236 |
| 2017/0103468 | A1* | 4/2017 | Orsini .................... G06Q 40/12 |
| 2017/0109639 | A1 | 4/2017 | Marcu et al. |
| 2017/0109668 | A1 | 4/2017 | Marcu et al. |

(Continued)

OTHER PUBLICATIONS

A NEO Way to Dragonchain Connecting ERC20 token projects with NEP-5 token projects, such as Biocrypt, May 16, 2018.

(Continued)

*Primary Examiner* — Dao Q Ho
(74) *Attorney, Agent, or Firm* — AEON Law, PLLC; Adam L. K. Philipp; Jonathan E. Olson

(57) ABSTRACT

Distributed public ledger interaction methods and systems are presented by which one or more elements of a first smart contract are privately recorded on a secure ledger node. In some variants the first smart contract is executed so as to retrieve public ledger node data from a first public ledger node so as to configure at least one transaction that is thereafter executed at least to the first public ledger node or to a second public ledger node (or both).

17 Claims, 12 Drawing Sheets

(56) References Cited

U.S. PATENT DOCUMENTS

| | | |
|---|---|---|
| 2017/0109735 A1* | 4/2017 | Sheng ................ G06Q 20/3678 |
| 2017/0109748 A1* | 4/2017 | Kote ...................... G06Q 40/12 |
| 2017/0116693 A1* | 4/2017 | Rae ........................ G06F 21/64 |
| 2017/0132630 A1* | 5/2017 | Castinado ........... G06Q 20/4014 |
| 2017/0287090 A1* | 10/2017 | Hunn .................... G06Q 50/18 |
| 2017/0364698 A1 | 12/2017 | Goldfarb et al. |
| 2018/0129955 A1 | 5/2018 | Saxena et al. |
| 2018/0157825 A1 | 6/2018 | Eksten et al. |
| 2018/0167198 A1 | 6/2018 | Muller et al. |
| 2018/0183606 A1 | 6/2018 | High et al. |
| 2018/0183687 A1 | 6/2018 | Dementev et al. |

OTHER PUBLICATIONS

DRAGONCHAIN Architecture Description Version 3, Joe Roets. Nov. 2016.
DRAGONCHAIN Business Summary, Version 5. Sep. 2017.
Hyperledger Caliper Readme.
Italian Stock Exchange to Develop Hyperledger-Based Blockchain Shares Platform by William Suberg, Jul. 19, 2017 https://cointelegraph.com/news/blockshow-announces-blockshow-americas-2018-conference-in-las-vegas-august-20-21.
Project Caliper Proposal.
Disney Dragonchain—Blockchain Use Cases.

\* cited by examiner

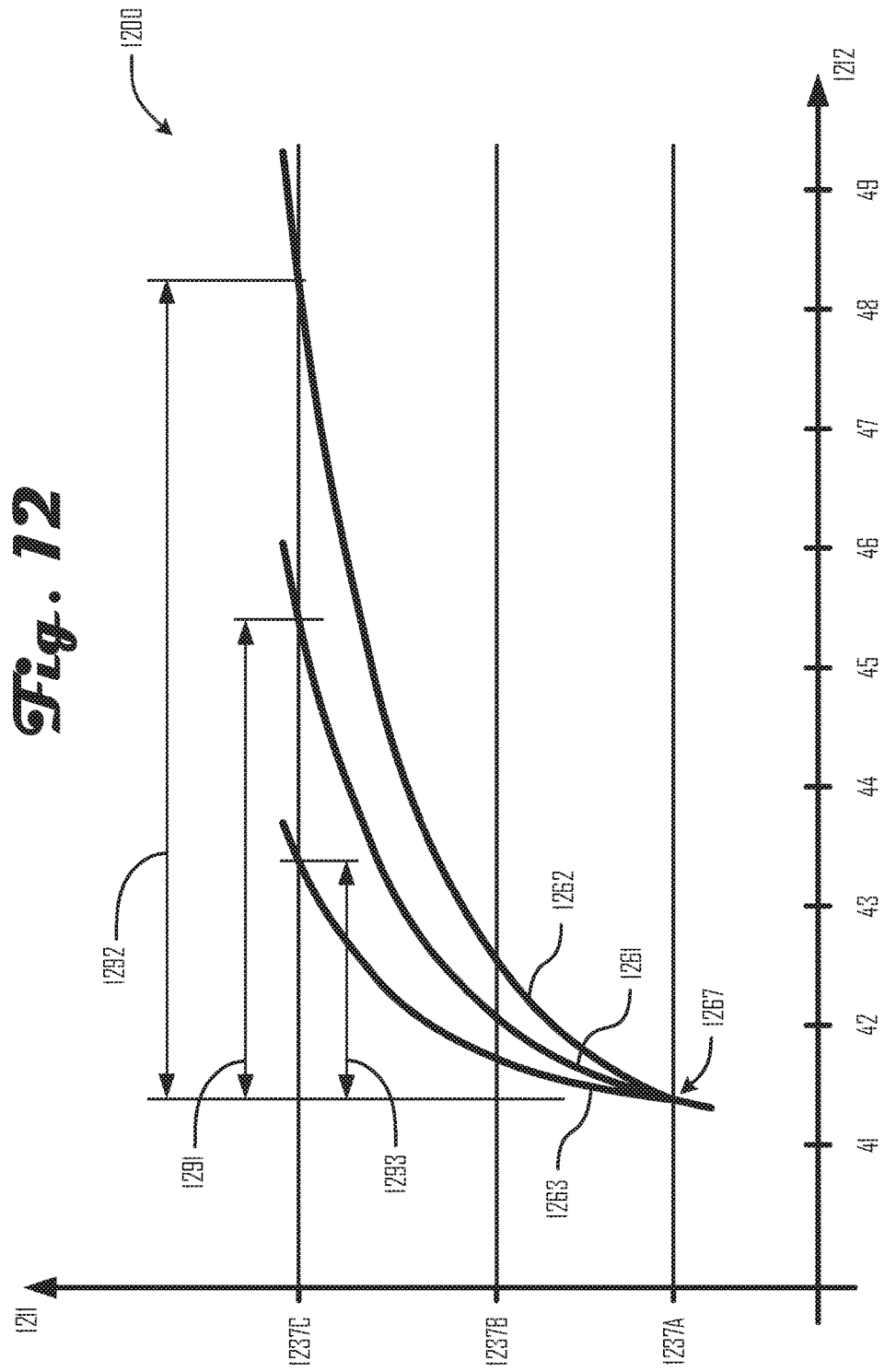

US 10,135,607 B1

DISTRIBUTED LEDGER INTERACTION SYSTEMS AND METHODS

RELATED APPLICATIONS

This application claims the benefit of U.S. Prov. App. No. 62/544,218 (entitled "Tokenized Micro-Licenses and Smart Contracts" and filed 11 Aug. 2017) which is incorporated by reference in its entirety for all purposes.

BACKGROUND

Before the 1990s, many software makers sold licenses to use a particular version of a software product. With the connectivity of the Internet, software could be updated readily by the vendor, and many software products were licensed for all updates for a major version of the product. That is, the user would have license rights to obtain and use all updates to a product until a new, major version was released. After a new release, they could continue to use the old and unsupported version or purchase an upgrade. This offered added flexibility to the consumer and vendor. The vendor could make much needed updates to fix bugs found after release and provide non-major upgrades. The consumer would get some level of new value in minor version of the product and also physically held the software to use at any time in the future. Some examples of the use of the version-based licensing model are Microsoft Windows 3.1 and Adobe Photoshop 7.0.

In the 1990s and 2000s, many software vendors began to use the approaching ubiquity of the Internet to provide subscription-based licensing, wherein the consumer pays on a time basis for access to software. In this model, the user will typically not hold the software or run it on a local machine. Instead, the software is managed and executed on centrally managed hardware by the vendor. This allows for very simple updates to the software in place in a consistent manner and will generally lower maintenance cost to the consumer and vendor. The vendor can control access to the services as welt and can provide the ability to provide feature driven pricing models for the services and particular advanced features. The negative for the consumer is generally in the loss of right and possession of the software. The model generally represents the shift from licensing rights to own the purchased software and possess it physically to a utility focused right. That is, the consumer has a right to access the service or its underlying application software interfaces (API). The consumer never possesses the software or its executable code. If the consumer stops paying for the subscription, access is withdrawn and is unavailable. Among other issues, this model did not standardize or solve the resulting issue with ownership of the consumers' data on the system. That is, when using a subscription license, how does a user retain control of the data produced or held in the subscription-based license system? If the system stores the data in the vendor's infrastructure (very typical due to efficiency), then the consumer will need some ability to extract their data from the vendor's storage. Some examples of the use of the subscription licensing model are Google GSuite, Microsoft Office 365, and Adobe Creative Cloud.

For these and many other security-related or efficiency-related aspects of distributed ledgers and devices via which they operate, a variety of technological improvements are presented below.

BRIEF DESCRIPTION OF THE DRAWINGS

FIG. 12 is another plot showing how trustworthiness can increase over time in which one or more improved vetting technologies may be incorporated.

DETAILED DESCRIPTION

Figure 1:
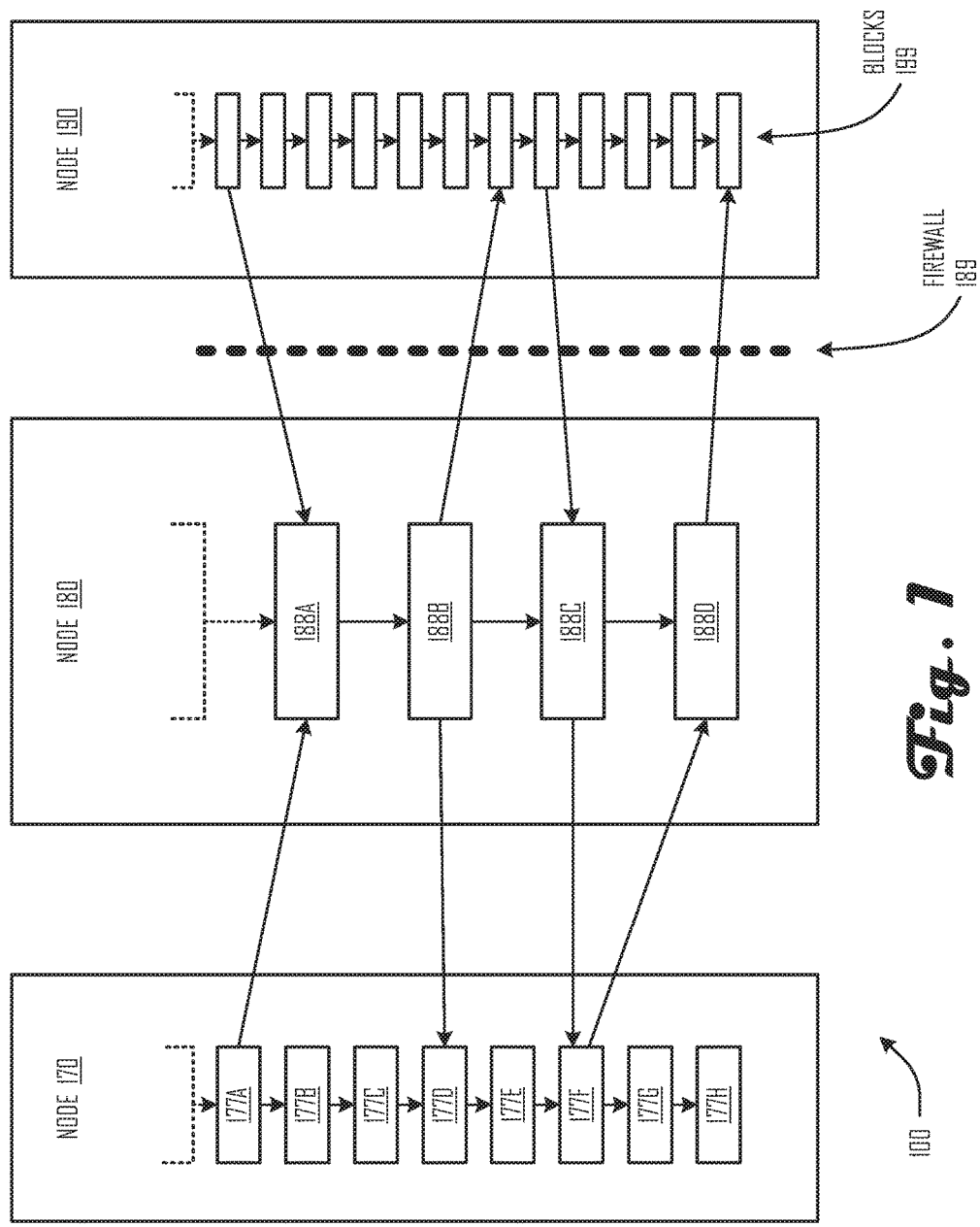
FIG. 1 schematically illustrates a system in which respective distributed ledger nodes interact according to one or more improved technologies.

The detailed description that follows is represented largely in terms of processes and symbolic representations of operations by conventional computer components, including a processor, memory storage devices for the processor, connected display devices and input devices. Furthermore, some of these processes and operations may utilize conventional computer components in a heterogeneous distributed computing environment, including remote file servers, computer servers and memory storage devices.

It is intended that the terminology used in the description presented below be interpreted in its broadest reasonable manner, even though it is being used in conjunction with a detailed description of certain example embodiments. Although certain terms may be emphasized below, any terminology intended to be interpreted in any restricted manner will be overtly and specifically defined as such.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

"Above," "accelerating," "achieved," "aggregate," "any," "application-type," "application-specific," "automatic," "availability," "based on," "because," "complete," "comprising," "conditional," "configured," "correlated," "current," "decelerating," "decreasing," "digital," "directly," "distributed," "executed," "first," "higher," "hybrid," "implemented," "inalterable," "included," "indicated,"

"integrated," "malicious," "monotonic," "more," "mutually," "negatively," "of," "otherwise," "particular," "partly," "positively," "prior," "private," "public," "received," "remote," "requester-specified," "responsive," "second," "sequencing," "shorter," "signaling," "single," "smart," "so as," "special-purpose," "specific," "stepwise," "suitability," "techniques," "temporal," "third," "through," "transistor-based," "undue," "updated," "upon," "utility," "version-controlled," "via," "without," or other such descriptors herein are used in their normal yes-or-no sense, not merely as terms of degree, unless context dictates otherwise. As used herein "inventory-type" instruction sets are those that primarily implement asset transfers or verifications thereof, moving quantities among accounts rather than changing them. As used herein "data transformative" instruction sets are those that primarily implement other kinds of computations. Although one of these types of instruction sets may invoke the other as a subroutine, only very rarely is a single code component of instructions a true hybrid.

In light of the present disclosure those skilled in the art will understand from context what is meant by "remote" and by other such positional descriptors used herein. Likewise they will understand what is meant by "partly based" or other such descriptions of dependent computational variables/signals. "On-chain" refers to (permanent) inclusion in a blockchain, whether or not such content is public or transparent. "On-list" encompasses not only on-chain but also other content linked and effectively rendered immutable using cryptography (e.g. in a consensus-based data verification). In an implementation that includes "on-list" content (e.g. a blockchain or tangle) as described below, "off-list" refers to content elements (e.g. an in-app account ledger) that have yet to be included "on-list." A "batch" data distribution (broadcast) is one in which data is directed to numerous recipients (i.e. dozens or more) within a limited time (e.g. less than 24 hours) after a triggering event (e.g. an administrator action or weekly trigger time). Terms like "processor," "center," "unit," "computer," or other such descriptors herein are used in their normal sense, in reference to an inanimate structure. Such terms do not include any people, irrespective of their location or employment or other association with the thing described, unless context dictates otherwise. "For" is not used to articulate a mere intended purpose in phrases like "circuitry for" or "instruction for," moreover, but is used normally, in descriptively identifying special purpose software or structures.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

FIG. 1 schematically illustrates a system 100 in which respective distributed ledger nodes 170, 180, 190 interact. Each node primarily include a blockchain or other distributed ledger, each occasionally progressing downward with the addition of a new block. As shown node 170 includes an oldest block 177A (built upon one or more predecessor blocks), a newest block 177H, and other blocks 177B-G between them. Node 180 likewise includes an oldest block 188A, a newest block 188D, and other blocks 188B-C between them. Node 190 likewise includes a chain of blocks. As further described below, node 180 has been constructed by a series of interactions with these other nodes 170, 190. One or more smart contracts of node 180 (see FIG. 6) read one or more elements from block 177A and from a particular one of the blocks 199 of node 190, combining the elements and recording the result in block 188A. Likewise one or more smart contracts provided one or more elements of block 188B to be recorded or otherwise reflected in block 177D and in a later one of the blocks 199 of node 190. Thereafter one or more elements of the then-newest block 199 of node 190 was read and used in generating block 188C, one or more elements of which were provided for use in node 170. That use allowed block 177F to be recorded, and one or more elements (e.g. transactions) thereof was recorded in block 188D and relayed to the now-newest block 199 of node 190. Insofar that smart contracts or other software agents may be executing at any or all of these nodes 170, 180, 190, a firewall 189 may be used to protect node 180 from pernicious code components or other forms of intrusion (e.g. from node 190). To guard against other forms of attack (e.g. from visitors), additional constraints may be imposed by one or more servers (e.g. of a network containing a private or hybrid public/private node 180).

As used herein, a plain reference numeral (e.g. like 177) may refer generally to a member of a class of items (e.g. like ledger blocks) exemplified with a hybrid numeral (e.g. like 177A) and it will be understood that every item identified with a hybrid numeral is also an exemplar of the class. Moreover although a reference numeral shared between figures refers to the same item, most figures depict respective embodiments.

Figure 2:
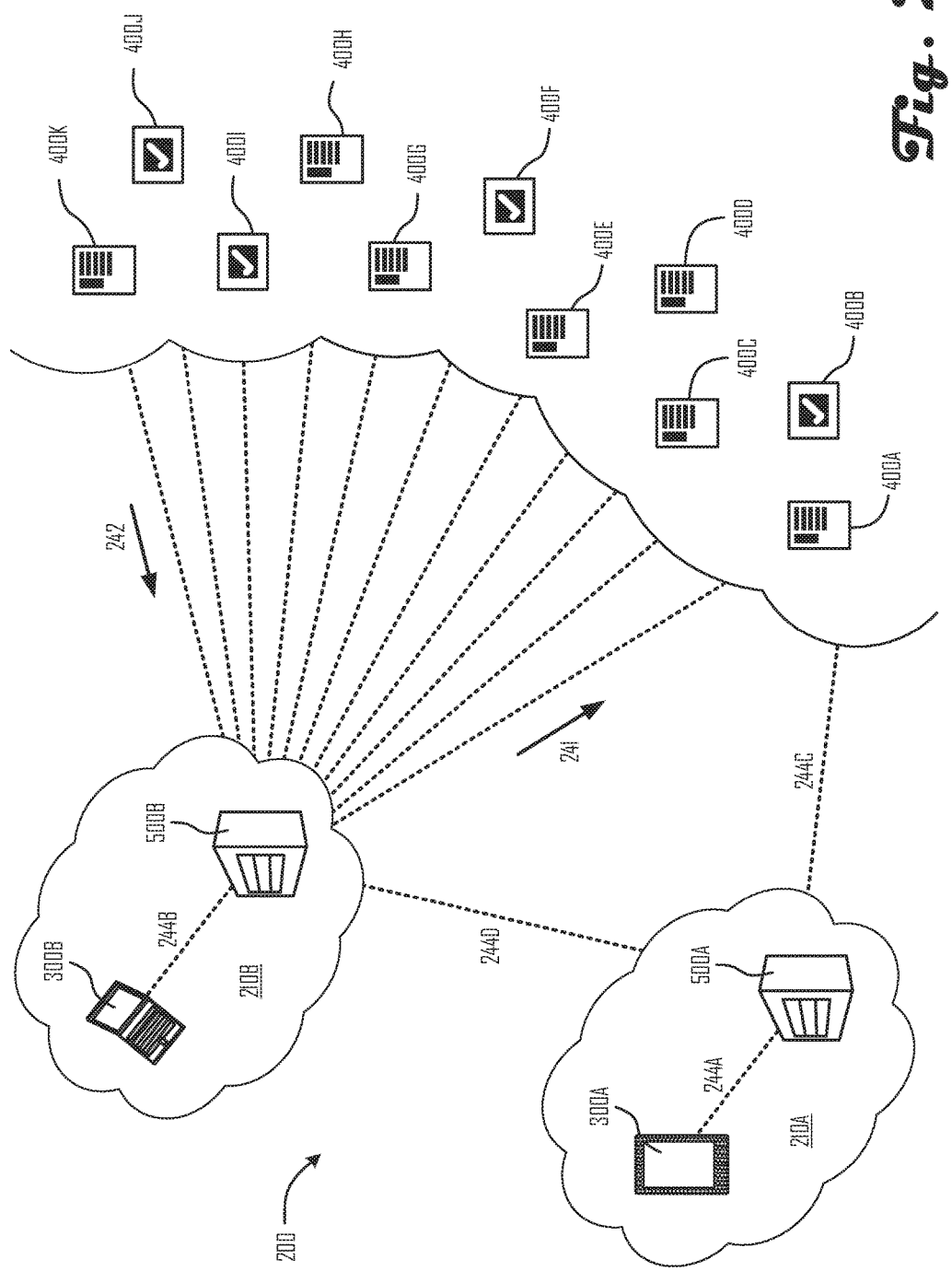
FIG. 2 schematically illustrates a system in which respective users or other entities interact with one another and with participating mining rigs or similar distributed devices in which one or more improved technologies may be incorporated.

FIG. 2 schematically illustrates a system 200 in which respective entities 210A-B interact with one another and with participating mining rigs 400K or similar distributed devices 400A-J many of which are, at various times, able to implement a transaction 241 or confirm an asset transfer or other occurrence as described below (e.g. by confirmations 242). In some variants a private entity 210A comprises one or more node management servers 500A that interact with one or more client devices 300A thereof (e.g. via respective instances of linkage 244A). Likewise a public or collective entity 210B comprises one or more node management servers 500B that interact with one or more client devices 300B thereof (e.g. via respective instances of linkage 244B). In some instances (e.g. in response to interactions via linkages 244C-D) the entities 210A-B may cooperate so that updates (e.g. indicia of dispensations, distributed ledger recordations, or other events) to values maintained at (one or more instances of) server 500B are received and so that adequately timely confirmations to those updates can occur in a decentralized fashion. In an instance where node 170 is distributed across multiple servers 500B in a proof-of-work architecture, for example, numerous proof-of-work blockchain nodes 400A, 400C, 400D, 400E, 400G, 400H, 400K (e.g. each implementing a mining rig) may validate changes to node 180 (e.g. by correctly identifying which block 177H was added last) so as to maintain or rebuild consensus. Alternatively or additionally, such consensus may be maintained or rebuilt using numerous (proof-of-stake or other) secure blockchain nodes 400B, 400F, 400I, 400J not configured as a mining rig may validate changes to node 180 in other blockchain proof architectures currently in public use.

Figure 3:
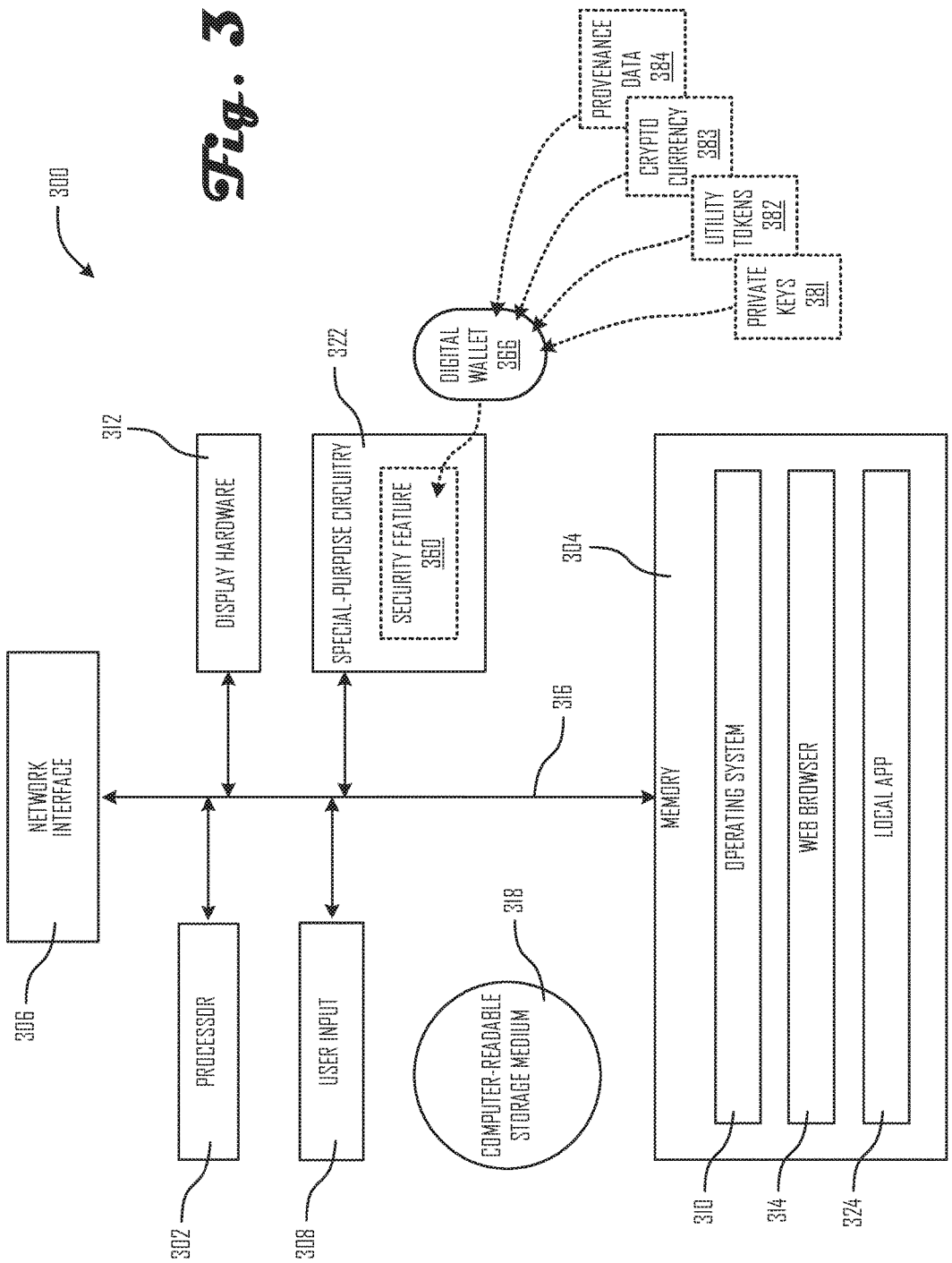
FIG. 3 depicts a client device in which one or more improved technologies may be incorporated.

Referring now to FIG. 3, there is shown a client device 300 in which one or more technologies may be implemented. Device 300 may include one or more instances of processors 302, memory 304, user inputs 308, and display hardware 312 all interconnected along with the network interface 306 via a bus 316. One or more network interfaces 306 allow device 300 to connect via the Internet or other networks to or within entities 210 of FIG. 2). Memory 304 generally comprises a random access memory ("RAM"), a read only memory ("ROM"), and a permanent mass storage device, such as a disk drive.

Memory 304 may contain one or more instances of operating systems 310, web browsers 314, and local apps 324. These and other software components may be loaded from a non-transitory computer readable storage medium 318 into memory 304 of the client device 300 using a drive mechanism (not shown) associated with a non-transitory computer readable storage medium 318, such as a floppy disc, tape, DVD/CD-ROM drive, flash card, memory card, or the like. In some embodiments, software components may also be loaded via the network interface 306, rather than via a computer readable storage medium 318. Special-purpose circuitry 322 may, in some variants, include some or all of the event-sequencing logic described below (e.g. in a peer-to-peer implementation) and one or more security features 360 (e.g. a fob or similar security apparatus).

In some contexts security feature 360 may implement or otherwise interact with a removable or other digital wallet 366. Such wallets may (optionally) each include one or more instances of private keys 381, of utility tokens 382, of crypto currency 383, of provenance data 384, or of device-executable code snippets (e.g. smart contracts) or the like as described below. In some embodiments client device 300 may include many more components than those shown in FIG. 3, but it is not necessary that all conventional components be shown in order to disclose an illustrative embodiment.

Figure 4:
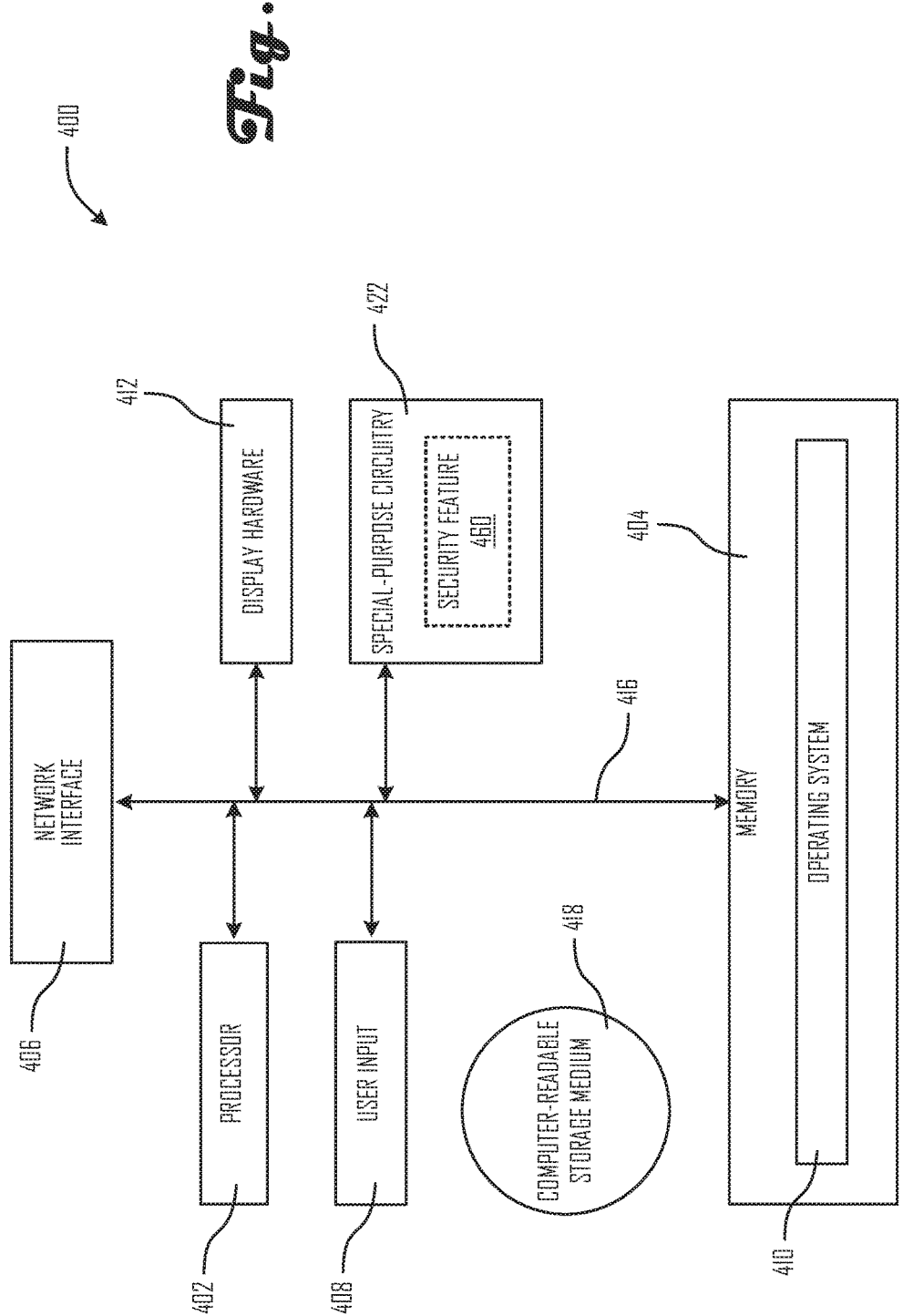
FIG. 4 depicts a distributed ledger verification device in which one or more improved technologies may be incorporated.

Referring now to FIG. 4, there is shown a distributed ledger verification device 400 like those of FIG. 2. Device 400 may include one or more instances of processors 402, memory 404, user inputs 408, and display hardware 412 all interconnected along with the network interface 406 via a bus 416. One or more network interfaces 406 allow device 400 to connect via the Internet or other networks to or within entities 210 of FIG. 2). Memory 404 generally comprises a random access memory ("RAM"), a read only memory ("ROM"), and a permanent mass storage device, such as a disk drive.

Memory 404 may contain one or more instances of operating systems 410 and special-purpose software. These and other software components may be loaded from a non-transitory computer readable storage medium 418 into memory 404 of the client device 400 using a drive mechanism (not shown) associated with a non-transitory computer readable storage medium 418, such as a floppy disc, tape, DVD/CD-ROM drive, flash card, memory card, or the like. In some embodiments, software components may also be loaded via the network interface 406, rather than via a computer readable storage medium 418. Special-purpose circuitry 422 may, in some variants, include some or all of the event-sequencing logic described below (e.g. in a peer-to-peer implementation) and one or more security features 460 (e.g. specially configured graphics processors or trusted entity private keys). In some embodiments client device 400 may include many more components than those shown in FIG. 4, but it is not necessary that all conventional components be shown in order to disclose an illustrative embodiment.

Figure 5:
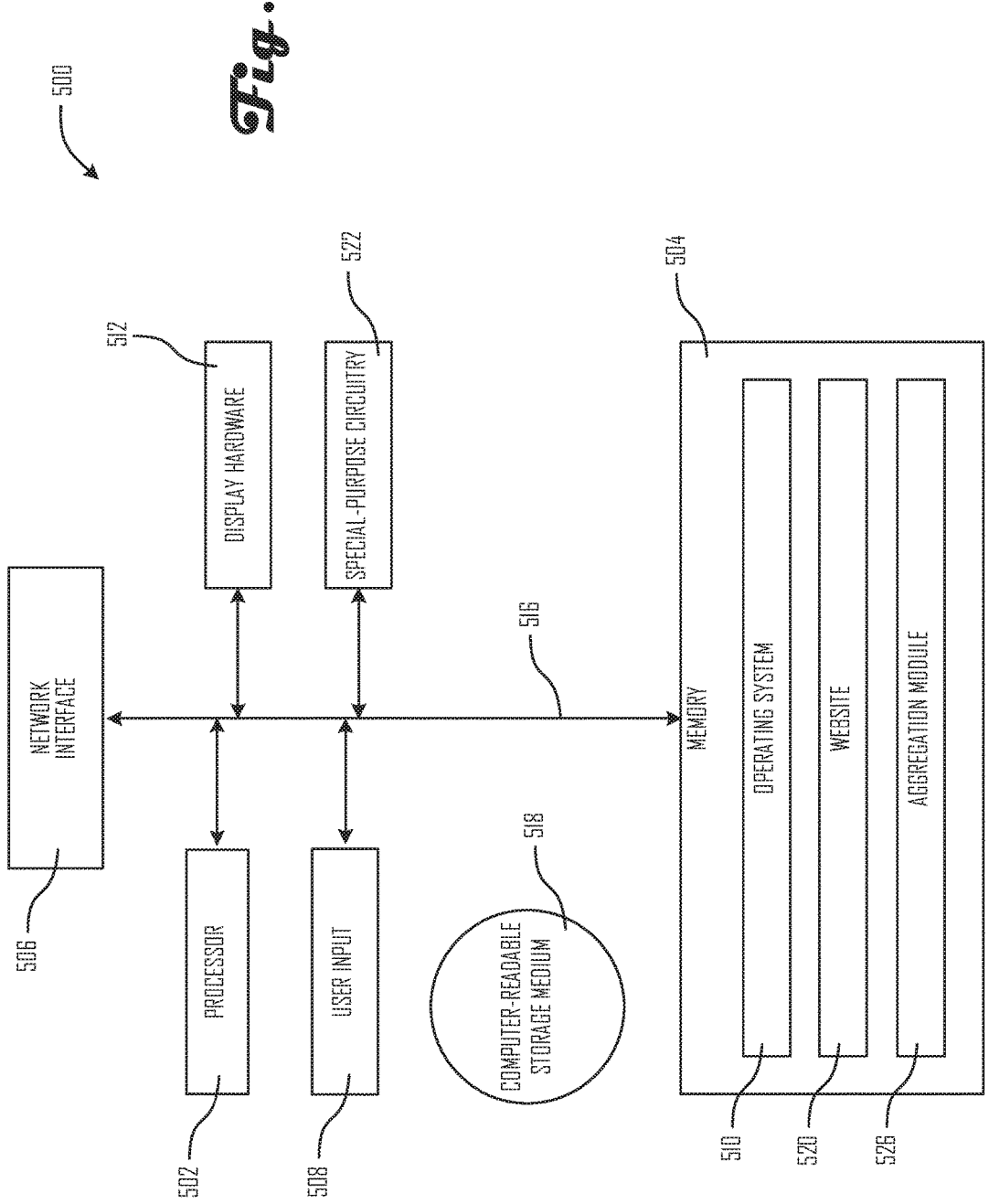
FIG. 5 depicts a server in which one or more improved technologies may be incorporated.

Referring now to FIG. 5, there is shown an exemplary server 500 like those of FIG. 2. Device 500 may include one or more instances of processors 502, memory 504, user inputs 508, and display hardware 512 all interconnected along with the network interface 506 via a bus 516. One or more network interfaces 506 allow device 500 to connect via the Internet or other networks to or within entities 210 of FIG. 2). Memory 504 generally comprises a random access memory ("RAM"), a read only memory ("ROM"), and a permanent mass storage device, such as a disk drive.

Memory 504 may contain one or more instances of operating systems 510, hosted websites 520, and aggregation modules 526. These and other software components may be loaded from a non-transitory computer readable storage medium 518 into memory 504 of the client device 500 using a drive mechanism (not shown) associated with a non-transitory computer readable storage medium 518, such as a floppy disc, tape, DVD/CD-ROM drive, flash card, memory card, or the like. In some embodiments, software components may also be loaded via the network interface 506, rather than via a computer readable storage medium 518. Special-purpose circuitry 522 may, in some variants, include some or all of the event-sequencing logic described below (e.g. in a peer-to-peer implementation) and one or more security features 560 (e.g. a firewall 189). In some embodiments client device 500 may include many more components than those shown in FIG. 5, but it is not necessary that all conventional components be shown in order to disclose an illustrative embodiment.

Figure 6:
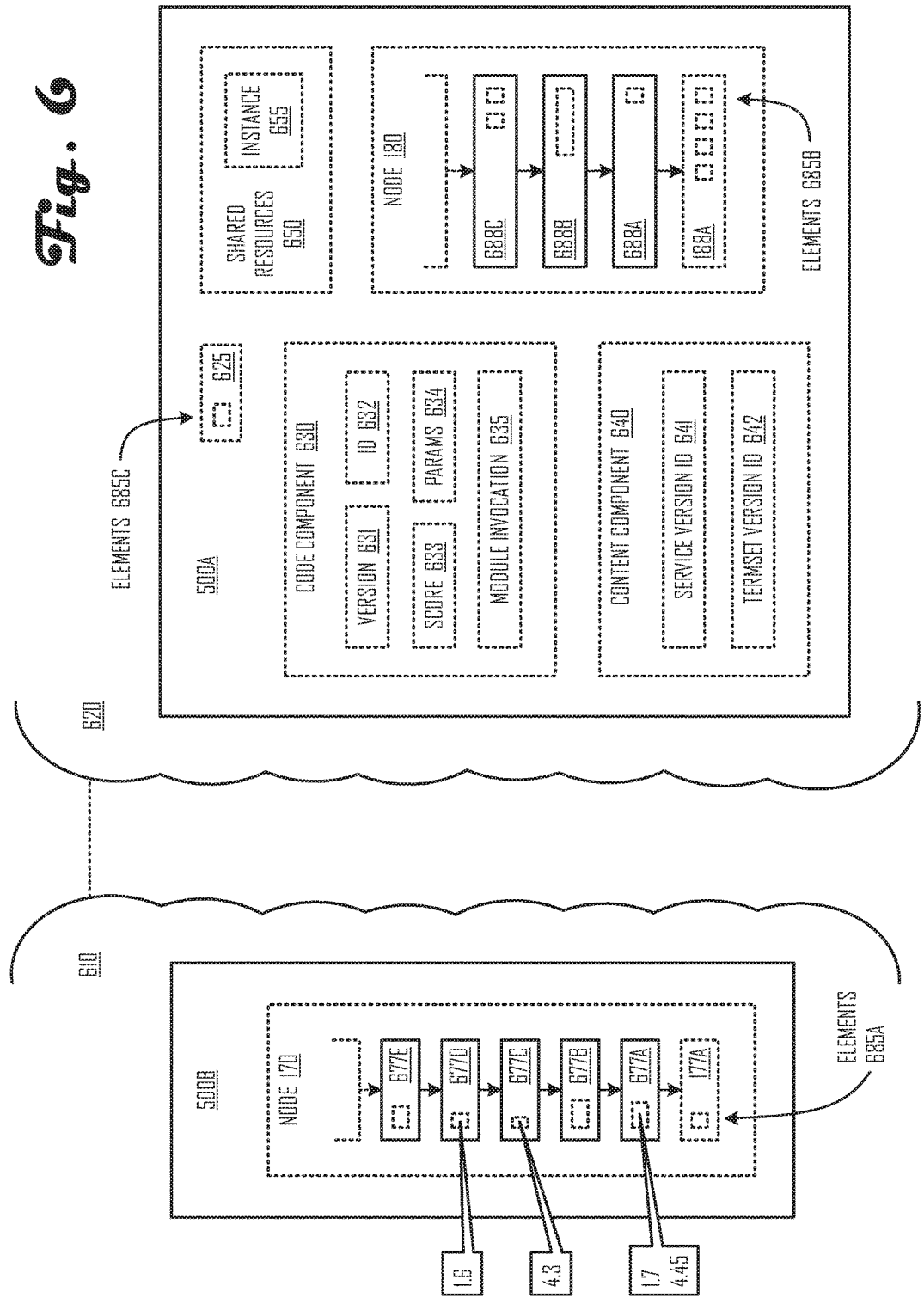
FIG. 6 depicts an earlier state of (a variant of) the system of FIG. 1.

FIG. 6 depicts an earlier state of (a variant of) the system 100 of FIG. 1, a configuration in which one or more servers 500A of a private or semi-private network (e.g. coinciding with entity 210A) interact with one or more servers 500B of a public or semi-public network 610 (e.g. coinciding with entity 210B). A (blockchain or other) distributed ledger node 170 shows the oldest block 177A thereof in FIG. 1 together with several of the preceding blocks 677A-E of the node. Most or all of these contain various elements 685A of interest in a permanent, public, verified, distributed arrangement. Likewise a private or other proprietary ledger node 180 shows the oldest block 188A thereof in FIG. 1 together with several of the preceding blocks 688A-C of the node. Most or all of these contain various elements 685B of interest in a permanent, secure arrangement that is at least partly accessible externally.

Such elements 685B may include one or more instances of smart contracts 625 or other code components 630 and in some variants may also include other content components 640 or shared resources 650 (or both) on-list as described herein. Such code components 630 may include one or more instances of routine or subroutine versions 631 (e.g. of device-executable code or source code thereof); of smart contract or other identifiers 632 (see FIG. 8); of trustworthiness-indicative or other scores 633 (e.g. pertaining to a code component 630 or an entity 210 that provides it); of Representation State Transfer protocol or other parameters 634; of timestamped (provenance data describing) module invocations 635 associated with such parameters 634; or of other data objects relating to executable code (e.g. transactions or other elements 685C of a smart contract 625) immutably recorded on chain. Such content components 640 may include one or more instances of service version identifiers 641 (e.g. identifying a most up-to-date version 631 of a code component 630), termset version identifiers 642 (e.g. identifying license terms or conditions in effect for a particular user at or before an execution as described herein), or other such timestamped data indelibly recorded in a ledger node 170, 180, 190. Such shared resources 650 may include built-in code (built-in subroutines called by some smart contracts 625) or a local instance 655 of a complete copy of a public ledger node 170, 190.

For example as described below, node 170 may reflect timestamped transitions from a service version identifier 641 of 1.5 just before block 677D to a service version identifier 641 of 1.6 in block 677D and several minutes later to a service version identifier 641 of 1.7 in block 677A as shown. Such service version identifiers 641 may pertain to all executions of a given module type (e.g. see FIG. 8) by a particular entity therebetween, for example. This can occur, for example, in a context in which a service type provenance would otherwise not be recorded on-chain without having access to the executions of the corresponding code component 630.

Likewise as further described below, node 170 may reflect timestamped transitions from a termset version identifier 642 of 4.2 just before block 677C to a termset version identifier 642 of 4.3 in block 677C and several minutes later to a termset version identifier 642 of 4.45 in block 677A as shown. Such transitions of termset version identifiers 642 may affect any and all executions of a given module type therebetween, for example, stating what priority will be applied or how utility tokens will be expended for the invocation of such execution. This can occur, for example, in a context in which public consensus could not otherwise be reached as to termset provenance (i.e. which license terms and conditions were in effect at the time of a particular execution of a code component).

Figure 7:
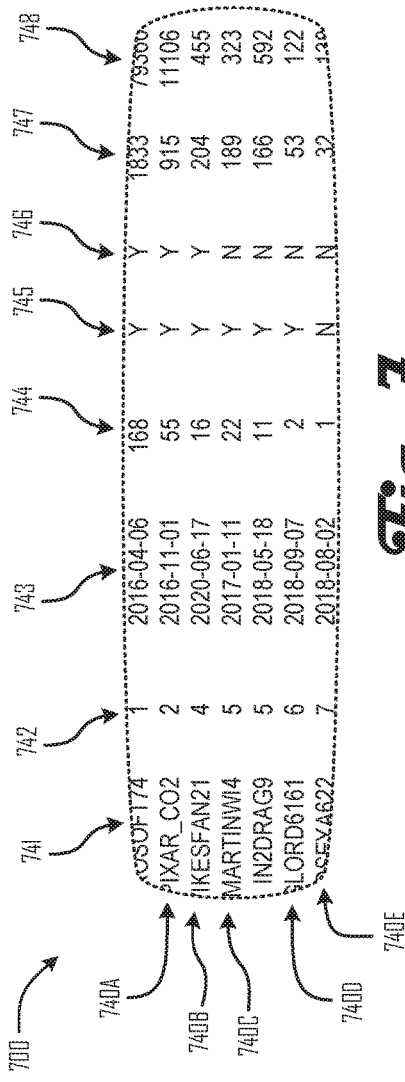
FIG. 7 depicts a media-resident record list in which one or more improved technologies may be incorporated.

FIG. 7 depicts a list 700 of records 740A-E each describing a (e.g. human) user or other content source 741 (e.g. a corporation or other entity 120). Each record 740 may include one or more instances of (privilege) tiers 741 (see FIG. 11); of dates 743 reflecting when that entity joined a cohort of users having privileges (e.g. according to the tiers 741) in some or all of network 620; of counts 744 (e.g. reflecting how many modules or versions have been uploaded by that entity); of (e.g. Boolean indications of) eligibility 745 for a lower privilege (e.g. posting a pictographic image or comment); of eligibility 746 for a higher privilege (e.g. posting a hyperlink or code component 630 so that it will be visible by other subscribers); of trustworthiness scores 747 (e.g. that increase over time at a variable rate absent suspicious behavior); of account balances 748 (e.g. of Dragon™ tokens or other utility tokens as described below); or of other tracked attributes (e.g. profile parameters) of an entity 120 having privileges on one or more servers 500A of network 620. In some variants such balances 748 may affect how fast a (positive scalar or other quantification of) trustworthiness of a content source 741 may increase, which may trigger (e.g. upon reaching a host-specified threshold as described herein) trigger a corresponding privilege (e.g. a power to upload content components 640).

Figure 8:
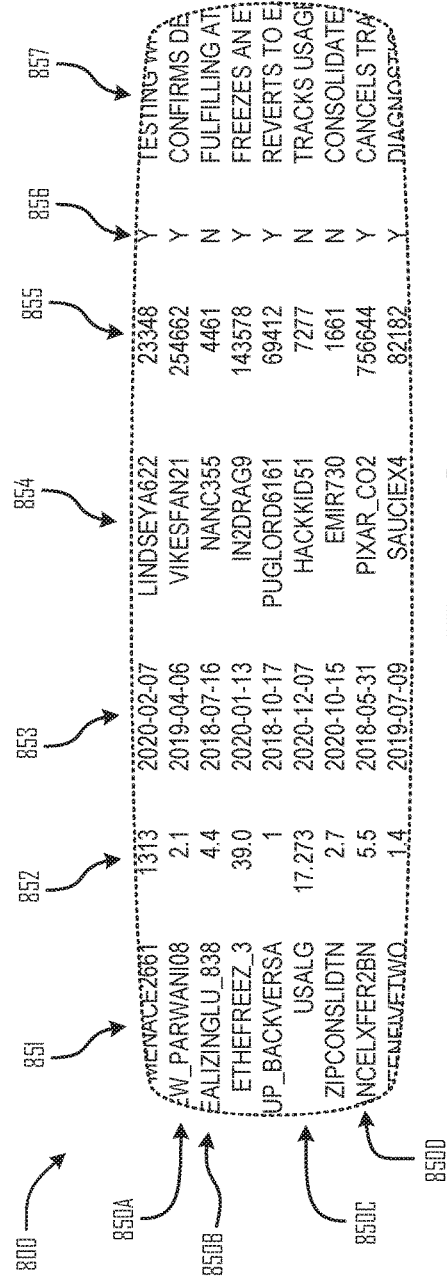
FIG. 8 depicts another media-resident record list in which one or more improved technologies may be incorporated.

FIG. 8 depicts a list 800 of records 850A-D each describing a smart contract or other device-executable code component 630 (e.g. in an inventory available to a particular user). Each record 850 may include one or more instances of alphanumeric or other module types 851; of alphanumeric or other version identifiers 852; of upload or release dates 853; of source identifiers 854 (e.g. corresponding to a content source 741 of list 700); of trustworthiness scores 855 (e.g. that increase over time at a variable rate absent suspicious behavior); of (Boolean indications of) suitability 856 for execution indicative of a high-enough trustworthiness (e.g. exceeding a threshold in effect for the particular user); of alphanumeric descriptors 857 describing each code component 630 (e.g. in a natural language) or version thereof; or of other tracked attributes (e.g. content components 640 in effect) of a code component 630 available for use on one or more servers 500A of network 620. In some variants such a current or recent balance 748 of a source 741 (e.g. with a source identifier 854 of "VIKESFAN21" in record 850A and record 740B) may affect how fast a (positive scalar or other quantification of) trustworthiness of a content component 640 is allowed to increase. This may trigger (e.g. upon reaching a host-specified threshold as described herein) a corresponding privilege (e.g. accessibility by or distribution to a larger cohort of users) for a given module or version 852.

Figure 9:
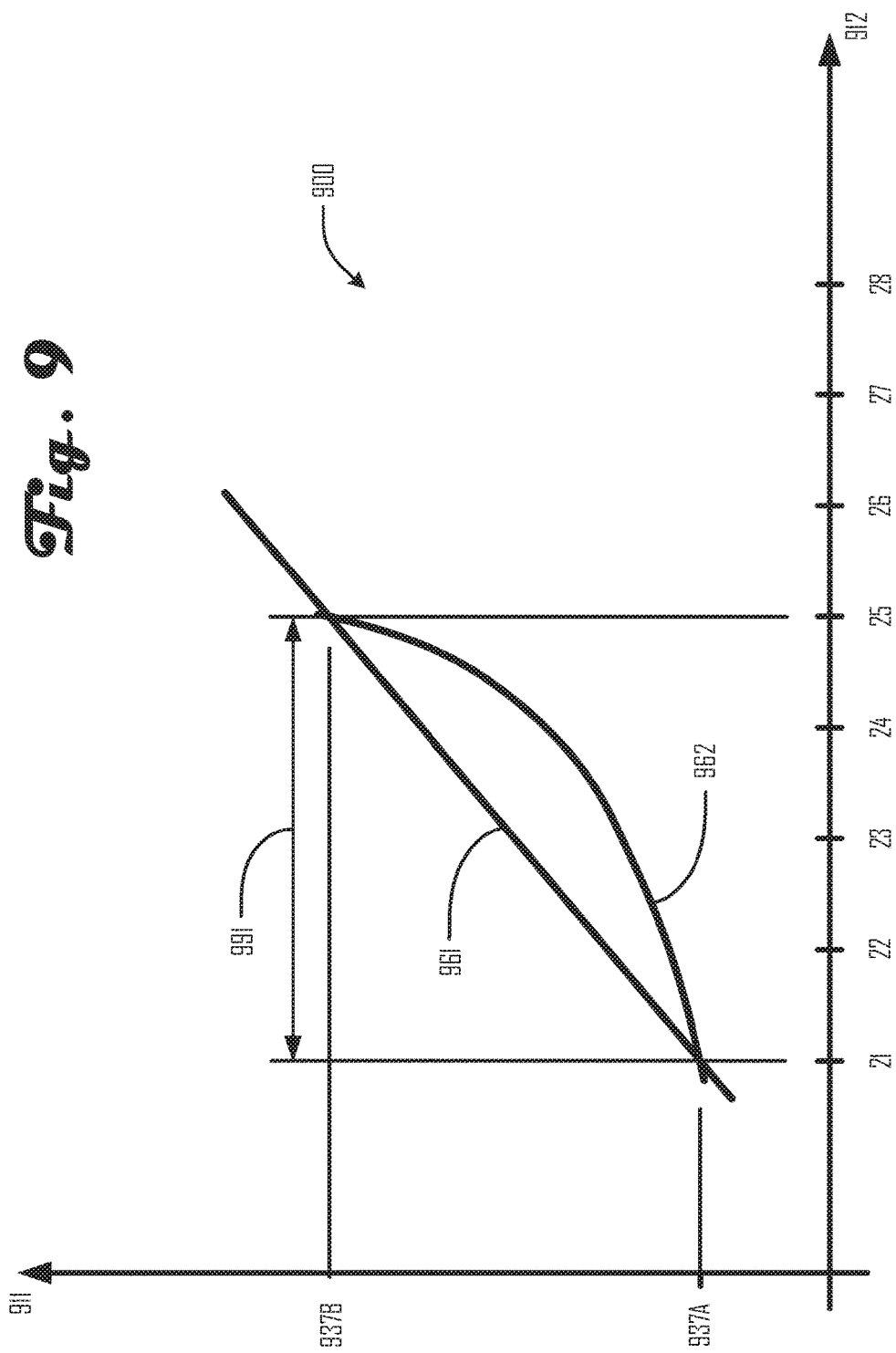
FIG. 9 is a plot showing how trustworthiness can increase over time in which one or more improved vetting technologies may be incorporated.

FIG. 9 exemplifies how (e.g. a scalar evaluation of) trustworthiness (e.g. of an entity or code component 630) can increase over time. A vertical axis 911 signifies a score 747, 855 (e.g. positively) indicative of trust plotted against a horizontal axis 912 signifying fixed units of time (e.g. days). A linear trajectory 961 shows trustworthiness increasing steadily from an initial value 937A to a threshold value 937B over a course of a few increments of time (e.g. from time 21 to time 25), wherein a privilege or other manifestation of status is bestowed (e.g. by one or more processors 502) upon reaching the threshold value 937B. In some variants an incremental increase or other manifestation of a slope of trajectory 961 may depend upon a current utility token balance 748 such that increasing the balance 748 incrementally decreases the interval 991 and decreasing the balance 748 incrementally increases the interval 991. In some variants an exponential, parabolic, hyperbolic, weighted polynomial, or other accelerating trajectory 962 may likewise quantify trustworthiness steadily increasing from initial value 937A to threshold value 937B over a course of the same interval 991. See FIGS. 11-12.

Figure 10:
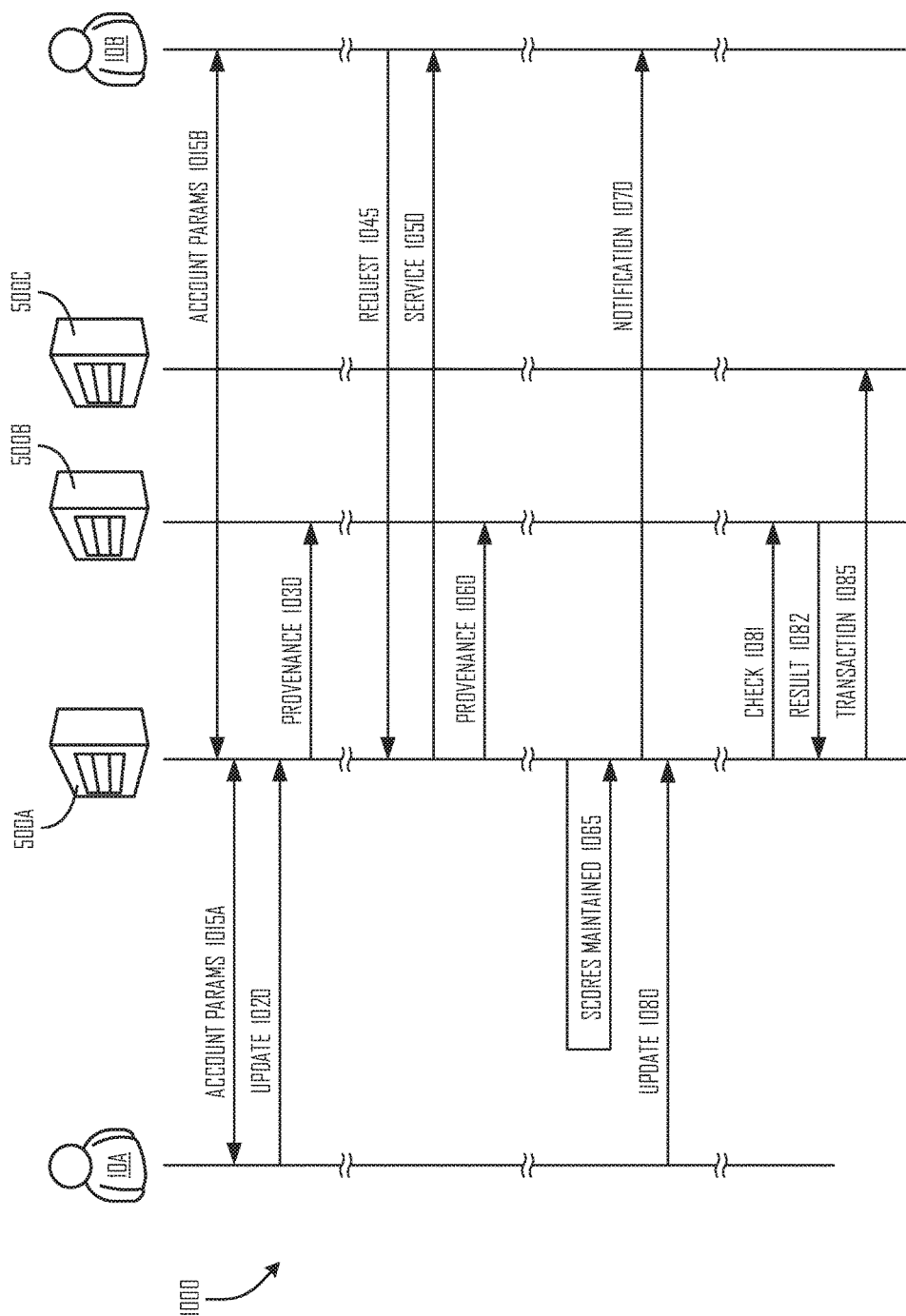
FIG. 10 depicts a particular scenario and progressive data flow in which client devices interact one or more servers according to one or more improved technologies.

FIG. 10 depicts a particular scenario and progressive data flow 1000 in which client devices 300 (operated by users or other human entities 10A-B) interact one or more servers 500A configured to control node 180, one or more servers 500B configured to facilitate access to node 170 (e.g. an Ethereum blockchain or other distributed ledger node featuring transaction-based state transitions and smart contract functionality), and one or more servers 500C configured to facilitate access to node 190 (e.g. a NEO blockchain or other distributed ledger node that supports code compiled into a secure executable environment). A coder or other human entity 10A configures a membership or similar account (e.g. on network 620) by establishing a profile and other account parameters 1015A. Likewise an execution requester or other human entity 10B configures a membership or similar account by establishing a profile and other account parameters 1015B as described herein.

Thereafter entity 10A uploads a smart contract update 1020 containing a smart contract or other device-executable code component 630 that becomes a definitive version 852 of that module type 851 upon recordation onto (a then-newest block 188A of) node 180. A corresponding code component update provenance 1030 (e.g. manifested as a hash function of block 188A or otherwise of content including code component 630) of that update 1020 is recorded onto a public node 170 (e.g. by one or more servers 500B thereof).

Some time later, a request 1045 for an execution of (whatever is the current version of) that module type 851 is sent from entity 10B (e.g. the "requester"). If status-related requirements (e.g. pertaining to privileges as described below) permit a grant of that request, an execution of the code component 630 commences (e.g. as service 1050) and a corresponding notification (of the grant) is sent. And a corresponding code component execution provenance 1060 (e.g. including one or more dispensations of any utility tokens 382 authorized by the requester and required for such execution) of that update 1020 is recorded onto a public node 170 (e.g. by one or more servers 500B thereof). In some variants, for example, such execution may include ongoing periodic or other multiple iterative component executions (e.g. every few hours or days) that effectively monitor one or more nodes 170 for the appearance of one or more defined phenomena of interest (e.g. transactions to or from a requester-specified digital wallet 366 that exceed a requester-specified event frequency).

Meanwhile scores 633, 747, 855 are updated or otherwise maintained 1065 (e.g. periodically in light of a current utility token balance 748). When such scores cross a threshold corresponding to an eligibility or other meaningful transition, a corresponding notification 1070 is sent to one or more entities 10B. When a smart contract update or other update 1080 occurs in relation to a code component 630 identified by an entity, in some variants that will trigger another such corresponding notification 1070.

If a smart contract service 1050 provides for iterative execution of a particular code component 630 that monitors one or more public nodes 170, a check 1081 of that node 170 (or a local instance 655 thereof) is initiated and a result 1082 is received (e.g. "Found" or "Not Found"). In some instances such results 1082 may be recorded to (e.g. a newest block of) or otherwise conditionally manifested as a transaction 1085 to another public blockchain (e.g. node 190).

Figure 11:
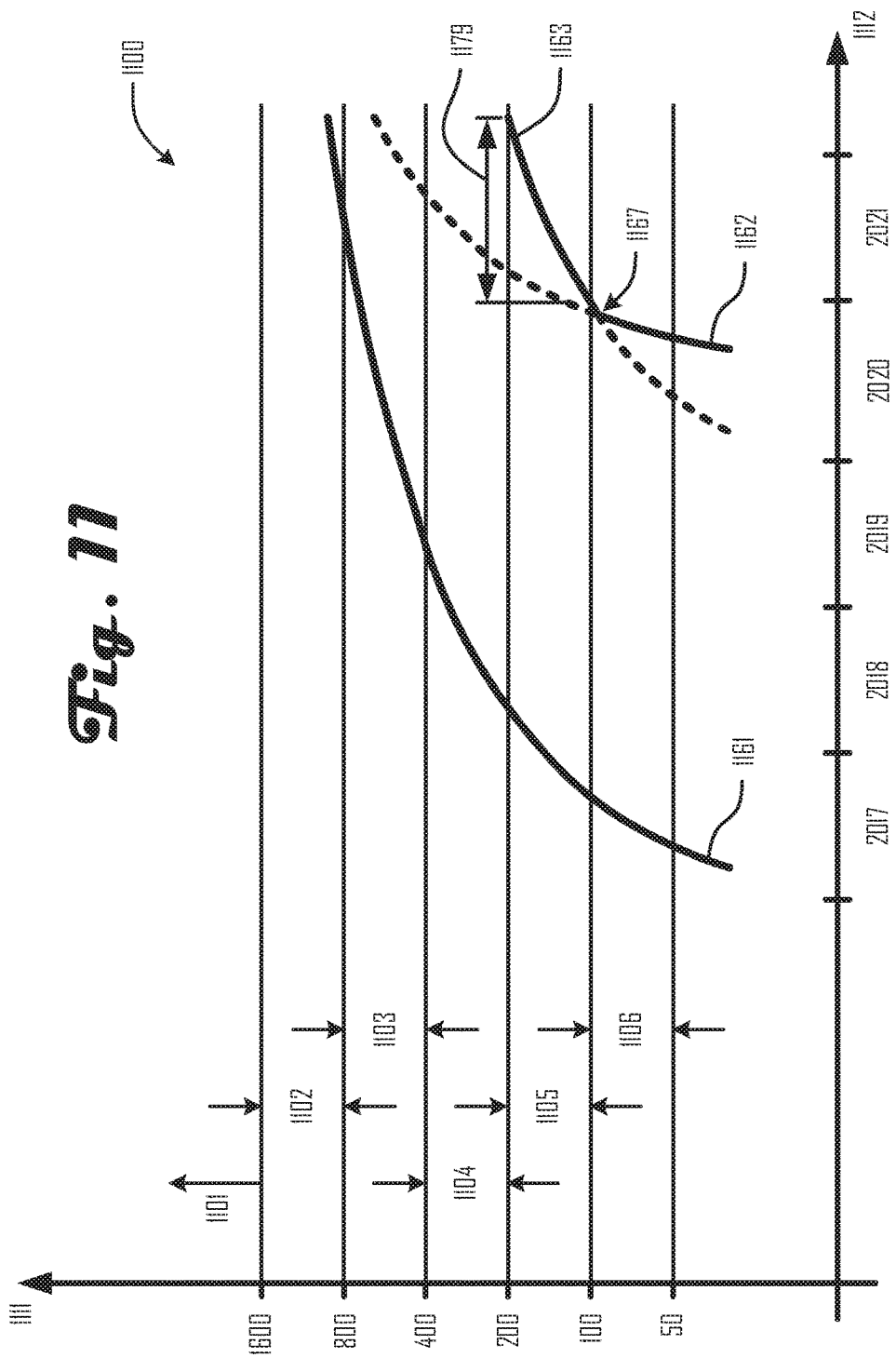
FIG. 11 is a semi-log plot showing how trustworthiness can increase over time in which one or more improved vetting technologies may be incorporated.

FIG. 11 depicts a semi-log plot 1100 with additional quantified examples of how trustworthiness (e.g. of an entity 10) can be deemed to increase over time. A vertical axis 1111 signifies (a logarithmic plot of) a score 747 indicative of trust plotted against a horizontal axis 1112 signifying fixed units of time (e.g. in years). As reflected in the tiers 742 pertaining to respective entities in FIG. 7, a tier 742 of "1" corresponds to range 1101 of scores 747 above 1600. Likewise a tier 742 of "2" corresponds to range 1102 of scores 747 above 800. Likewise a tier 742 of "3" corresponds to range 1103 of scores 747 above 400. Likewise a tier 742 of "4" corresponds to range 1104 of scores 747 above 200. Likewise a tier 742 of "5" corresponds to range 1105 of scores 747 above 100. Likewise a tier 742 of "6" corresponds to range 1106 of scores 747 above 50. Intermediate trajectory 1161 reflects how an entity identified as (a username of) "PIXAR_CO2" might have risen from an initial score 747 below 50 (in 2016) linearly to a most recent score 747 above 800 in 2022. A much faster trajectory 1162 indicates a traversal of range 1105 that would have taken much less than a year. However a transition 1167 marks decelerating transition (e.g. a divestiture of a substantial majority of utility tokens) experience by a user called "VIKESFAN" in late 2020, so that the traversal of range 1105 (across interval 1179) was actually much slower, taking more than a year to a most recent score of 204.

FIG. 12 like exemplifies how trustworthiness increases (e.g. from an initial value 1237A to a threshold value 1237B-C) can be made faster or slower, depicting a score 855 (e.g. of a smart contract or other code component 630) can be deemed to increase over time 1212 (e.g. in incremental units 41-49 of an hour or a day). In some variants a logarithmic, parabolic, hyperbolic, weighted polynomial, or other decelerating trajectory 1261 may likewise quantify trustworthiness steadily increasing from an initial value 1237A (e.g. signifying a transition 1267) to a threshold value 1237C over an intermediate interval 1291 of a few hours or days. On a slower trajectory 1262 (e.g. corresponding to a lower balance 748), a score 855 of the code component traverses the same increase in an interval 1292 that is more than 10% longer (slower) than the intermediate trajectory 1261. Likewise on a faster-than-intermediate trajectory 1263 (e.g. corresponding to a higher balance 748), a score 855 of the code component 630 traverses the same increase in an interval 1293 that is more than 10% shorter (faster) than the intermediate trajectory 1261. Moreover it can be seen from FIG. 9 that the same variations can be implemented for accelerating or linear trajectories 961-962 as well.

Figure 13:
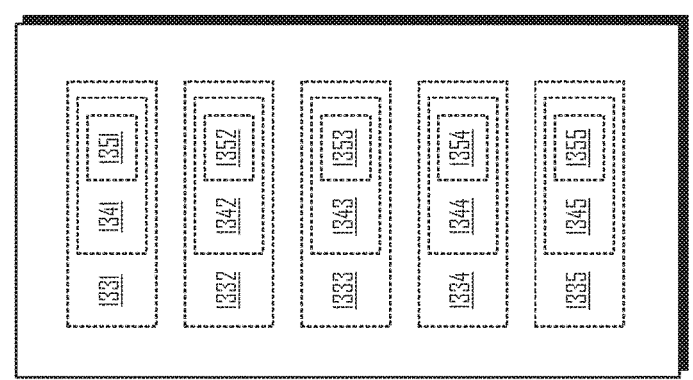
FIG. 13 depicts special-purpose transistor-based circuitry in which one or more improved technologies may be incorporated.

FIG. 13 depicts special-purpose transistor-based circuitry 1300—optionally implemented as an ASIC or in a UI governance server, for example—in which some or all of the functional modules described herein may be implemented. Transistor-based circuitry 1300 includes one or more instances of sequencing modules 1331, for example, each including an electrical node set 1341 upon which informational data is represented digitally as a corresponding voltage configuration 1351. Transistor-based circuitry 1300 likewise includes one or more instances of sequencing modules 1332 each including an electrical node set 1342 upon which informational data is represented digitally as a corresponding voltage configuration 1352. Transistor-based circuitry 1300 likewise includes one or more instances of responsive modules 1333 each including an electrical node set 1343 upon which informational data is represented digitally as a corresponding voltage configuration 1353. Transistor-based circuitry 1300 likewise includes one or more instances of responsive modules 1334 each including an electrical node set 1344 upon which informational data is represented digitally as a corresponding voltage configuration 1354. Transistor-based circuitry 1300 likewise includes one or more instances of responsive modules 1335 each including an electrical node set 1345 upon which informational data is represented digitally as a corresponding voltage configuration 1355. In some variants, as described below in the clauses and claims, such a module implements such functionality jointly (e.g. in conjunction with other modules or processors 302 described herein). Alternatively or additionally, in some variants such modules (or components thereof) may be distributed (e.g. so that some are implemented in special-purpose circuitry 522 of respective servers 500) as described above.

Figure 14:
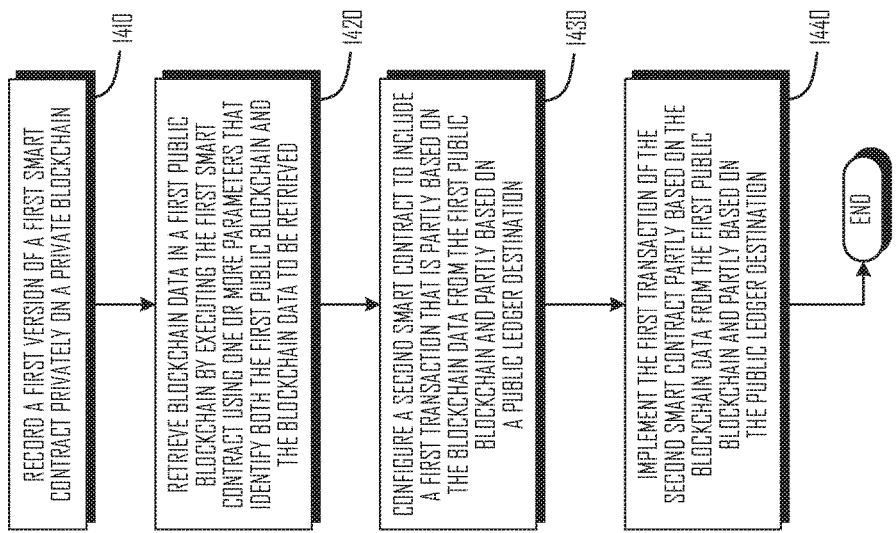
FIG. 14 depicts an operational flow in which one or more improved technologies may be incorporated.

FIG. 1400 illustrates an operational flow 1400 suitable for use with at least one embodiment, such as may be performed (in some variants) on one or more servers 500 using special-purpose circuitry 522. As will be recognized by those having ordinary skill in the art, not all events of information management are illustrated in FIG. 14. Rather, for clarity, only those steps reasonably relevant to describing the distributed ledger interaction aspects of flow 1400 are shown and described. Those having ordinary skill in the art will also recognize the present embodiment is merely one exemplary embodiment and that variations on the present embodiment may be made without departing from the scope of the broader inventive concept set forth in the clauses and claims below.

Operation 1410 describes recording one or more (device-executable code components 630, service version identifiers 641, terms version identifiers 642, or other) elements of a first version of a first smart contract privately on a first private blockchain (e.g. one or more sequencing modules 1331 in one or more servers 500A triggering a recordation of one or more elements 685B of a first version 631 of a first smart contract privately on node 180). This can occur, for example, in a context in which node 180 implements the first private blockchain, in which a timestamp of a block containing the entire first smart contract or a code component 630 thereof is manifested as a voltage configuration 1351 on node set 1341, in which version control of the first smart contract is maintained on the one or more servers 500A (e.g. on node 180); in which the one or more servers 500A are configured to disable and report on any actual or apparent instance of unauthorized activity discovered (e.g. by flagging the version and recording the discovery on node 180); in which the one or more servers 500A may suggest to a requesting entity 10B that an older version 852 of the same module type 851 may be used in response to data corruption or other indicia of defects resulting from an execution of one or more code components 630; in which insufficient termset-indicative or service-version-indicative metadata (or both) would otherwise be difficult to obtain in relation to a particular execution; in which a vulnerability in network 610 was first found by an enterprising discoverer (e.g. entity 10A); and in which the discoverer would otherwise be incentivized to exploit the vulnerability rather than report it.

Operation 1420 describes retrieving blockchain data in a first public blockchain by executing the first smart contract using one or more parameters that identify both the first public blockchain and the blockchain data to be retrieved (e.g. one or more sequencing modules 1332 of the one or more servers 500A initiating an execution of the first version 631 of the first smart contract and thereby retrieving the blockchain data using one or more parameters 634 that explicitly or otherwise identify both node 170 and the elements 685A to be retrieved from it). This can occur, for example, in a context in which node 170 implements the first public blockchain; in which the node data comprises one or more elements 685A of block 677A; in which an address of a local instance 655 of node 170 is manifested as a voltage configuration 1352 on node set 1342; in which the local instance 655 is kept current enough that the blockchain data is validly retrieved from the public node 170 (e.g. by updates of once or more per hour) even if the first smart contract really only ever reads from the local instance 655; and in which sequencing module 1332 invokes most or all of the responsive modules 1333-1335 described herein. This can occur, for example, in a context in which one or more responsive modules 1333 is configured to compute one or more scores 633, 747, 855 described above and to implement conditional privileges accordingly; in which resulting eligibilities 744-745 and suitabilities 856 (e.g. according to tiers 742 and threshold values 937, 1237 described herein) are thereby determined and manifested as a voltage configuration 1353 on node set 1343; and in which the special-purpose circuitry 1300 would not otherwise achieve a workable balance between expediting legitimate activity and disempowering mischief (e.g. trolling and other malicious activity).

Operation 1430 describes configuring a second smart contract to include a first transaction that is partly based on the blockchain data from the first public blockchain and partly based on a public ledger destination (e.g. one or more sequencing modules 1334 of the one or more servers 500A creating or adapting the second smart contract 625 to include one or more elements 685 in a transaction partly based on first public ledger node data from node 170 and partly based on an address of the public ledger destination). This can occur, for example, in a context in which the first public ledger node data includes one or more elements 685A of block 177A (as shown in FIG. 1); in which the public ledger destination comprises (a newest block 199 of) node 190; and in which the second smart contract 625 is assembled on one or more servers 500A of network 620.

Operation 1440 describes implementing the first transaction of the second smart contract partly based on the blockchain data from the first public blockchain and partly based on the public ledger destination (e.g. one or more sequencing modules 1335 of the one or more servers 500A implementing at least some of the second smart contract 625 include one or more elements 685C as the first transaction). This can occur, for example, in a context in which the public ledger destination includes node 170 (e.g. at block 177D); in which the first public ledger node data includes one or more elements 685A of block 177A (as shown in FIG. 1); and in which an inalterable version-controlled module type 851 (e.g. implementing the first smart contract or other built-in code component 630) could not otherwise be securely and selectively shared among users selectively (e.g. as a privilege described herein).

For example an instance of block 677E was recorded when a service version identifier 641 of a first smart contract was 1.5 and when a termset version identifier 642 of the first smart contract was 4.2 in a particular scenario relating to FIGS. 6 and 14. When block 677D was later recorded, a service version identifier 641 of the same smart contract became 1.6 (e.g. signifying a different version of the software implementing that smart contract). If an undesired and unforeseen problem is discovered by entity 10B in an output from the newer service version 1.6, an administrator of the one or more servers 500A may trigger a reversion to a prior service version state (e.g. version 1.5) or implement a new version 1.7 copied or adapted from earlier blocks (e.g. before block 677E) that is effectively the same as version 1.5 was. Likewise a termset version identifier 642 of the same smart contract became 4.3 upon block 677C being recorded. Such changes may signify a threshold 937, 1237 being adjusted, for example, or a utility token changing basis (e.g. from a unit of time to an instance of execution per token). If a complaint is received (e.g. reflecting an unexpected overcharge or misdirected token movement) in regard to terms or conditions of such service under version 4.3, an administrator of the one or more servers 500A may trigger a reversion to a prior termset version state (e.g. version 4.2) or implement a new version 4.45 copied or adapted from earlier blocks (e.g. before block 677E) that is effectively the same as version 4.2 was. Although the prior states of the service and termset versions are immutably recorded on node 180, they may remain private and readily available and, in some variants, may even be searchable within node 180.

In light of teachings herein, numerous existing techniques may be applied for configuring special-purpose circuitry or other structures effective for configuring and otherwise managing transactions and other operations as described herein without undue experimentation. See, e.g., U.S. Pat. No. 9,747,586 ("System and method for issuance of electronic currency substantiated by a reserve of assets"); U.S. Pat. No. 9,672,499 ("Data analytic and security mechanism for implementing a hot wallet service"); U.S. Pat. No. 9,646,029 ("Methods and apparatus for a distributed database within a network"); U.S. Pat. No. 9,569,771 ("Method and system for storage and retrieval of blockchain blocks using Galois fields"); U.S. Pat. No. 9,569,439 ("Context-sensitive query enrichment"); U.S. Pub. No. 20180183687 ("System and Method for Managing Services and Licenses Using a Blockchain Network; U.S. Pub. No. 20180183606 ("Verifying Authenticity of Computer Readable Information Using the Blockchain; U.S. Pub. No. 20180167198 ("Trust Enabled Decentralized Asset Tracking for Supply Chain and Automated Inventory Management; U.S. Pub. No. 20180157825 ("Systems and Methods for Determining Trust Levels for Computing Components Using Blockchain;

U.S. Pub. No. 20180129955 ("Hybrid Blockchain Data Architecture for use Within a Cognitive Environment; U.S. Pub. No. 20170364698 ("Fragmenting data for the purposes of persistent storage across multiple immutable data structures; U.S. Pub. No. 20170287090 ("System and method for creating and executing data-driven legal contracts; U.S. Pub. No. 20170116693 ("Systems and Methods for Decentralizing Commerce and Rights Management for Digital Assets Using a Blockchain Rights Ledger; U.S. Pub. No. 20170109668 ("Model for Linking Between Nonconsecutively Performed Steps in a Business Process; U.S. Pub. No. 20170109639 ("General Model for Linking Between Nonconsecutively Performed Steps in Business Processes; U.S. Pub. No. 20170109638 ("Ensemble-Based Identification of Executions of a Business Process"); U.S. Pub. No. 20160260095 ("Containerized Computational Task Execution Management Using a Secure Distributed Transaction Ledger"); U.S. Pub. No. 20130061288 ("Method for controlling trust and confidentiality in daily transactions of the digital environment"); U.S. Pub. No. 20120095908 ("Distributed Computing for Engaging Software Services"); U.S. Pub. No. 20120020476 ("Method for Performing a Cryptographic Task in an Electronic Hardware Component"); and U.S. Pub. No. 20100332336 ("System and method for electronic wallet conversion").

Although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various system, method, article of manufacture, or other embodiments or aspects have been disclosed above, also, other combinations of embodiments or aspects will be apparent to those skilled in the art in view of the above disclosure. The various embodiments and aspects disclosed above are for purposes of illustration and are not intended to be limiting, with the true scope and spirit being indicated in the final claim set that follows.

In the numbered clauses below, specific combinations of aspects and embodiments are articulated in a shorthand form such that (1) according to respective embodiments, for each instance in which a "component" or other such identifiers appear to be introduced (e.g. with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

CLAUSES

1. A distributed public ledger interaction system comprising:
transistor-based circuitry (e.g. one or more sequencing modules 1331 of transistor-based circuitry 1300) configured to record one or more (device-executable code components 630, service version identifiers 641, terms version identifiers 642, or other) elements 685B of a first version 631 of a first smart contract (e.g. comprising an instance of device-executable code component 630) privately (e.g. on one or more secure servers 500B) on a first private ledger node (e.g. node 180); and
transistor-based circuitry (e.g. one or more sequencing modules 1332) configured to execute the first version 631 of the first smart contract (e.g. 1) so as to retrieve first public ledger node data (e.g. comprising one or more elements 685A of block 677A) in a first public ledger node (e.g. comprising a public blockchain or other distributed ledger node 170) by executing the first version 631 of the first smart contract using one or more parameters 634 that identify both the first public ledger node (e.g. node 170) and the first public ledger node data (e.g. comprising elements 685A) to be retrieved and (e.g. 2) so as to configure a second smart contract (e.g. comprising another instance of device-executable code component 630) to include a first transaction that is partly based on the first public ledger node data from the first public ledger node (e.g. particular elements 685A of node 170) and partly based on a first attribute of a public ledger destination (e.g. an address of node 170 or format requirement of node 190) and (3) so as to implement the first transaction of the second smart contract partly based on the first public ledger node data from the first public ledger node and partly based on the public ledger destination.

2. The system of Clause 1, wherein all of the transistor-based circuitry 1300 is implemented on a single application-specific integrated circuit (ASIC).

3. The system of Clause 1, wherein the transistor-based circuitry 1300 is distributed across two or more mutually remote facilities.

4. The system of Clause 1, wherein the public ledger destination identifies the first public ledger node.

5. The system of Clause 1, wherein the public ledger destination identifies a second public ledger node.

6. The system of ANY one of the above system clauses, wherein the transistor-based circuitry configured to execute the first version 631 of the first smart contract comprises:
transistor-based circuitry configured to condition an execution of the first version 631 of the first smart contract upon a first trustworthiness indication (e.g. a score 633 along a trajectory that generally increases with time) reaching an execution trust requirement (e.g. a threshold 1237), wherein a first entity is associated with the execution trust requirement upon a completion of a first temporal interval that depends upon a utility token balance 748 of the first entity during the first temporal interval 1291, wherein a second entity is associated with the execution trust requirement upon a completion of a second temporal interval that depends upon a utility token balance 748 of the second entity during the second temporal interval 1292, wherein a third entity is associated with the execution trust requirement upon a completion of a third temporal interval 1293 that depends upon a utility token balance 748 of the third entity during the third temporal interval, and wherein all of the temporal intervals 1291-1293 are negatively correlated with the utility token balances (e.g. each to a corresponding one of the utility token balances so as to associate steeper trust increases with larger token balances).

7. The system of ANY one of the above system clauses, wherein the transistor-based circuitry configured to execute the first version 631 of the first smart contract comprises:
transistor-based circuitry configured to condition an execution of the first version 631 of the first smart contract upon a first trustworthiness indication (e.g. score 747 or score 855) reaching a threshold value 937 wherein a first entity (e.g. identified as "VIKESFAN21") achieves an execution trust requirement in a first temporal interval 1291

(having a duration that is) negatively correlated with a utility token balance 748 of the first entity during the first temporal interval 1291, wherein negative correlation signifies that a second entity is associated with the execution trust requirement in a second temporal interval 1292 that is longer than the first temporal interval 1291 because the second entity has had a lower utility token balance 748 than the utility token balance 748 of the first entity during the first temporal interval 1291, and wherein a third entity is associated with the execution trust requirement in a third temporal interval 1293 that is shorter than the first temporal interval 1291 because the third entity has had a higher utility token balance 748 than the utility token balance 748 of the first entity during the first temporal interval 1291.

8. The system of ANY one of the above system clauses, wherein the transistor-based circuitry configured to execute the first version 631 of the first smart contract comprises:

transistor-based circuitry configured to condition an availability notification 1070 of the first version 631 of the first smart contract upon a first trustworthiness indication wherein the first version 631 achieves an availability notification trust requirement (e.g. a threshold 1237) in a first temporal interval 1291 negatively correlated with a utility token balance 748 (e.g. wherein an aggregate balance decreasing tends to lengthen the time interval in a stepwise or monotonic fashion) of a source 741 of the first version 631 during the first temporal interval 1291.

9. The system of ANY one of the above system clauses, wherein the private ledger node resides on one or more private servers 500B of a private or hybrid-private network 620 wherein one or more (instances of) application-type code components 630 are configured to be initiated only by an expenditure of one or more special-purpose utility tokens 382 (e.g. Dragon™ tokens as described below).

10. The system of ANY one of the above system clauses, wherein the private ledger node 180 resides on one or more private servers 500B wherein one or more (instances of) application-type code components 630 are configured to be initiated only by an expenditure of one or more special-purpose utility tokens 382 and wherein at least one of the one or more special-purpose utility tokens 382 includes a first embedded license term in a smart contract codifying one or more requirements that a request 1045 must fulfill before a particular service 1050 identified by the request may be accessed.

11. The system of ANY one of the above system clauses, wherein the private ledger node resides on one or more private servers 500B configured so that one or more (e.g. instances of) code components 630 are impossible for a particular user (e.g. a member or other entity 10B) to initiate directly through any payment tokens (e.g. Bitcoin or similar cryptocurrencies) but in which the particular user can initiate (an execution of) at least one of the one or more code components 630 by expending some number of special-purpose utility tokens 382 (e.g. Dragon™ tokens as described below) owned by the particular user.

12. The system of ANY one of the above system clauses, wherein the one or more elements 685B of the first version 631 of the first smart contract comprise a movement of one or more special-purpose utility tokens 382 (e.g. a purchase to or expenditure from a digital wallet 366 or other inventory of a single private entity).

13. The system of ANY one of the above system clauses, wherein the one or more elements 685B of the first version 631 of the first smart contract are recorded "privately" insofar that a complete copy of the first private ledger node resides on a network 620 that is owned by a single private entity.

14. The system of ANY one of the above system clauses, wherein the one or more elements 685B of the first version 631 of the first smart contract are recorded "privately" insofar that the first public ledger node (e.g. node 170) and the first private ledger node (node 180) are separated by a firewall 189.

15. The system of ANY one of the above system clauses, further comprising:

a physical article implementing a digital wallet 366 configured to receive one or more special-purpose utility tokens 382 upon an execution of the second smart contract.

16. The system of ANY one of the above system clauses, further comprising:

a physical article implementing a digital wallet 366 that includes crypto assets 373 (e.g. utility tokens or cryptocurrency) that can later be used by an owner of the digital wallet 366.

17. The system of ANY one of the above system clauses, wherein the transistor-based circuitry configured to execute the first version 631 of the first smart contract causes one or more processors 502 (when executing the first version 631) to transmit the first transaction of the second smart contract to the second public ledger node 190, wherein the first public ledger node data includes a first service version identifier 641 (e.g. becoming a service version 1.7 by virtue of one or more elements 685A in block 677A), and wherein the prior public ledger node data includes a prior service version identifier 641 (having been a service version 1.5 just before block 677D and service version 1.6 by virtue of one or more elements 685A in block 677D).

18. The system of ANY one of the above system clauses, wherein the transistor-based circuitry configured to execute the first version 631 of the first smart contract causes one or more processors 502 (when executing the first version 631) to transmit the first transaction of the second smart contract to the second public ledger node, wherein the first public ledger node data includes a first termset version identifier 642 (e.g. becoming a termset version 4.45 by virtue of one or more elements 685A in block 677A) and wherein the prior public ledger node data includes a prior termset version identifier 642 (e.g. updating from termset version 4.2 to termset version 4.3 by including an element 685A of 4.3 in a transaction of a new block 677C).

19. The system of ANY one of the above system clauses, wherein the transistor-based circuitry configured to execute the first version 631 of the first smart contract causes one or more processors 502 (when executing the first version 631) to transmit the first transaction of the second smart contract to the second public ledger node, wherein the first public ledger node data includes a first service version identifier 641 and a first termset version identifier 642 and wherein the prior public ledger node data includes a prior service version identifier 641 and a prior termset version identifier 642.

20. The system of System Clause 1, wherein the transistor-based circuitry configured to execute the first version 631 of the first smart contract comprises:

transistor-based circuitry (e.g. as an instance of special-purpose circuitry 522) configured to execute the first version 631 of the first smart contract so as to retrieve the first public ledger node data in the first public ledger node so as to detect a first parametric update (e.g. one or more versions 631 or other elements 685A of blocks 677 changing) therein relative to prior public ledger node data (e.g. as shown in FIG. 6).

21. The system of ANY one of the above system clauses, wherein the transistor-based circuitry 1300 is also configured to perform one or more methods described below.

22. A distributed public ledger interaction method comprising:

invoking transistor-based circuitry (e.g. one or more sequencing modules 1331) configured to record one or more (device-executable code components 630, service version identifiers 641, terms version identifiers 642, or other) elements 685B of a first version 631 of a first smart contract (e.g. comprising an instance of device-executable code component 630) privately (e.g. on one or more secure servers 500B) on a first private ledger node (e.g. node 180); and invoking transistor-based circuitry (e.g. one or more sequencing modules 1332) configured to execute the first version 631 of the first smart contract (e.g. 1) so as to retrieve first public ledger node data (e.g. comprising one or more elements 685A of block 677A) in a first public ledger node (e.g. comprising a public blockchain or other distributed ledger node 170) by executing the first version 631 of the first smart contract using one or more parameters 634 that identify both the first public ledger node (e.g. node 170) and the first public ledger node data (e.g. comprising elements 685A) to be retrieved and (2) so as to configure a second smart contract 625 (e.g. comprising a data-transformative instruction set or some other instance of a device-executable code component 630) to include a first transaction that is partly based on the first public ledger node data from the first public ledger node (e.g. particular elements 685A of node 170) and partly based on a first attribute of a public ledger destination (e.g. an address of node 170 or format requirement of node 190) and (3) so as to implement the first transaction of the second smart contract partly based on the first public ledger node data from the first public ledger node and partly based on the public ledger destination.

23. The method of Clause 22, wherein the public ledger destination identifies the first public ledger node.

24. The method of Clause 22, wherein the public ledger destination identifies a second public ledger node.

25. The method of Clause 22, wherein said distributed ledger destination implements a serverless architecture blockchain platform (e.g. as described below in Appendix B).

26. The method of Clause 22, wherein the public ledger destination identifies (at least) the first public ledger node and a second public ledger node.

27. The method of ANY one of the above method clauses, wherein the private ledger node 180 resides on one or more private servers 500B wherein one or more (instances of) application-type code components 630 are configured to be initiated only by an expenditure of one or more special-purpose utility tokens 382.

28. The method of ANY one of the above method clauses, wherein at least one of the one or more special-purpose utility tokens 382 determine one or more elements 685B (e.g. an embedded license term defining a request format or smart contract initiation protocol) that a request 1045 must contain before a particular service 1050 identified by the request may be received.

29. The method of ANY one of the above method clauses, wherein the invoking transistor-based circuitry configured to execute said first version 631 of said first smart contract comprises (at least) iteratively monitoring one or more public nodes 170 for one or more requester-specified phenomena of interest, wherein the one or more requester-specified phenomena of interest include first and second asset transfers from a requester-specified digital wallet 366 with a frequency of occurrence that exceeds a requester-specified frequency threshold.

30. The method of ANY one of the above method clauses, wherein the first private ledger node resides on one or more private servers 500 configured so that one or more (e.g. instances of) code components 630 are impossible for a particular entity 10B to invoke (e.g. trigger an execution of) directly through any payment token (e.g. plentiful Bitcoin owned by the particular entity 10B and available) but in which the particular entity 10B can initiate (an execution of) at least one of the one or more code components 630 by expending some number of special-purpose utility tokens 382 (e.g. a quantity of "Dragons" as described below) owned by the particular entity 10B.

31. The method of ANY one of the above method clauses, wherein the second smart contract 625 is a data-transformative instruction set.

32. The method of ANY one of the above method clauses, wherein the second smart contract 625 contains a special-purpose license that is maintained on the public ledger destination via a consensus-based distributed authentication protocol (e.g. in a block of a blockchain), wherein the special-purpose license is configured to control access to another (instance of) code component 630.

33. The method of ANY one of the above method clauses, wherein the public ledger destination maintains a rights provenance for a particular execution of the first smart contract (e.g. as version identifiers or other elements 685A).

34. The method of ANY one of the above method clauses, wherein the one or more elements 685B of the first version 631 of the first smart contract comprise a movement of one or more special-purpose utility tokens 382 (e.g. a purchase to or expenditure from a digital wallet 366 or other inventory of a single private entity).

35. The method of ANY one of the above method clauses, wherein the invoking transistor-based circuitry configured to execute the first version 631 of the first smart contract comprises:

transmitting a result of the first transaction of the second smart contract (e.g. transaction 241) partly based on the first public ledger node data from the first public ledger node and partly based on the public ledger destination being implemented to one or more mining rig nodes 400G-H.

36. The method of ANY one of the above method clauses, wherein the invoking transistor-based circuitry configured to execute the first version 631 of the first smart contract comprises:

accepting an expenditure of a utility token 382 belonging to an entity 10B who transmitted a request 1045 for an execution of the first smart contract that is conditional upon the request 1045 being granted, wherein the utility token 382 contains an embedded license term defining a smart contract initiation protocol that must be used for the request 1045 to be granted.

37. The method of ANY one of the above method clauses, wherein the invoking transistor-based circuitry configured to execute the first version 631 of the first smart contract comprises:

accepting an expenditure of a utility token 382 belonging to an entity 10B who transmitted a request 1045 for an execution of the first smart contract that is conditional upon the request 1045 being granted, wherein the utility token 382 contains an embedded license term defining a smart contract initiation protocol that includes a particular request format that must be used for the request 1045 to be granted.

38. The method of ANY one of the above method clauses, wherein the invoking transistor-based circuitry configured to execute the first version 631 of the first smart contract comprises:

accepting an expenditure of a utility token 382 belonging to an entity 10B who transmitted a request 1045 for an execution of the first smart contract that is conditional upon the request 1045 being granted, wherein the utility token 382 contains an embedded license term defining a smart contract initiation protocol that must be used for the request 1045 to be granted, and wherein a stateless protocol is used as the smart contract initiation protocol.

39. The method of ANY one of the above method clauses, wherein the invoking transistor-based circuitry configured to execute the first version 631 of the first smart contract comprises:

accepting an expenditure of a utility token 382 belonging to an entity 10B who transmitted a request 1045 for an execution of the first smart contract that is conditional upon the request 1045 being granted, wherein the utility token 382 contains an embedded license term defining a smart contract initiation protocol that must be used for the request 1045 to be granted, and wherein a Representation State Transfer protocol is used as the smart contract initiation protocol.

40. The method of ANY one of the above method clauses, wherein the invoking transistor-based circuitry configured to execute the first version 631 of the first smart contract comprises:

iteratively monitoring one or more public nodes 170 for one or more requester-specified phenomena of interest, wherein the one or more requester-specified phenomena of interest include first and second asset transfers from a requester-specified digital wallet 366.

41. The method of ANY one of the above method clauses, wherein the invoking transistor-based circuitry configured to execute the first version 631 of the first smart contract comprises:

iteratively monitoring one or more public nodes 170 for one or more requester-specified phenomena of interest, wherein the one or more requester-specified phenomena of interest include first and second asset transfers from a requester-specified digital wallet 366 with a frequency of occurrence that exceeds a requester-specified frequency threshold.

42. The method of ANY one of the above method clauses, wherein the first private ledger node 180 resides on one or more private servers 500B wherein one or more (instances of) application-type code components 630 are configured to be initiated only by an expenditure of one or more special-purpose utility tokens 382 (and not by any conventional cryptocurrency).

43. The method of ANY one of the above method clauses, wherein the first private ledger node 180 resides on one or more private servers 500B wherein one or more (instances of) application-type code components 630 are configured to be initiated only by an expenditure of one or more special-purpose utility tokens 382 (and not by any conventional cryptocurrency).

44. The method of ANY one of the above method clauses, wherein the invoking the transistor-based circuitry configured to record the one or more elements 685B of the first version 631 of the first smart contract comprises:

recording an entirety of the first version 631 of the first smart contract with metadata describing the first version 631 of the first smart contract all in a single block of the first private ledger node 170, wherein the metadata includes an alphanumeric identifier 632 of the first smart contract, wherein the metadata includes a then-current score 633 of the first smart contract, wherein the metadata includes a natural language description of one or more parameters 634 with which the first smart contract may be executed, and wherein the metadata includes a required tier 742 or other quantification that a requester must satisfy to be eligible to initiate an execution of the first smart contract.

45. The method of ANY one of the above method clauses, wherein the invoking transistor-based circuitry configured to execute the first version 631 of the first smart contract comprises:

iteratively executing the first transaction of the second smart contract on an ongoing periodic basis.

46. The method of ANY one of the above method clauses, wherein the invoking transistor-based circuitry configured to execute the first version 631 of the first smart contract comprises:

iteratively executing the first transaction of the second smart contract on an ongoing periodic basis with a frequency greater than once per week.

47. The method of ANY one of the above method clauses, wherein the invoking transistor-based circuitry configured to execute the first version 631 of the first smart contract comprises:

iteratively executing the first transaction of the second smart contract on an ongoing periodic basis with a frequency greater than once per day.

48. The method of ANY one of the above method clauses, wherein the invoking transistor-based circuitry configured to execute the first version 631 of the first smart contract comprises:

iteratively monitoring one or more public nodes 170, 190 for one or more requester-specified phenomena of interest.

49. The method of ANY one of the above method clauses, wherein the invoking transistor-based circuitry configured to execute the first version 631 of the first smart contract comprises:

iteratively monitoring one or more public nodes 170, 190 for one or more requester-specified phenomena of interest, wherein the one or more requester-specified phenomena of interest include a transaction pertaining to a requester-specified digital wallet 366.

50. The method of ANY one of the above method clauses, wherein the invoking transistor-based circuitry configured to execute the first version 631 of the first smart contract comprises:

iteratively monitoring one or more public nodes 170, 190 for one or more requester-specified phenomena of interest, wherein the one or more requester-specified phenomena of interest include first and second asset transfers from a requester-specified digital wallet 366.

51. The method of ANY one of the above method clauses, wherein the invoking transistor-based circuitry configured to execute the first version 631 of the first smart contract comprises:

iteratively monitoring one or more public nodes 170, 190 for one or more requester-specified phenomena of interest, wherein the one or more requester-specified phenomena of interest include first and second asset transfers from a requester-specified digital wallet 366 with a frequency of occurrence that exceeds a requester-specified frequency threshold (e.g. daily).

52. The method of ANY one of the above method clauses, wherein a Dragon™ token as described below is used as a utility token 382 so as to invoke (an execution of) the first version 631 of the first smart contract.

53. The method of ANY one of the above method clauses, wherein a Dragon™ token as described below is used as a utility token 382 so as to invoke (at least) the first transaction of the second smart contract.

54. The method of ANY one of the above method clauses, wherein each expenditure of one or more utility tokens 382 by an entity 10A who supplies the first smart contract increases a time interval 991, 1291 until that entity obtains an eligibility 745, 746.

55. The method of ANY one of the above method clauses, wherein each expenditure of one or more utility tokens 382 by an entity 10B who requests a service 1050 that includes executing the first smart contract increases a time interval 991, 1291 until that entity obtains an eligibility 745, 746.

56. The method of ANY one of the above method clauses, wherein each expenditure of one or more utility tokens 382 by an entity 10A who supplies a (code component 630 or other) content component 640 increases a time interval 991, 1291 until the content component 640 obtains an eligibility (e.g. becoming associated with an affirmative Boolean indication of suitability 856).

57. The method of ANY one of the above method clauses, further comprising:
implementing an interchain interaction system 100 like that depicted in FIG. 1.

58. The method of ANY one of the above method clauses, further comprising:
transmitting a result of the second smart contract to a cryptographically secured handheld digital wallet 366 like that of FIG. 3.

59. The method of ANY one of the above method clauses, further comprising:
implementing an interchain interaction system having smart contracts 625 and other shared resources 650 like those depicted in FIG. 6.

60. The method of ANY one of the above method clauses, further comprising:
implementing an interchain interaction system using a media-resident record list 700 like that of FIG. 7 to characterize respective human entities 10.

61. The method of ANY one of the above method clauses, further comprising:
implementing an interchain interaction system using a media-resident record list 800 like that of FIG. 8 to characterize respective version-controlled types of code components 630.

62. The method of ANY one of the above method clauses, further comprising:
implementing a conditional notification 1070 to an entity 10B who has requested and received a service 1050 as depicted in FIG. 10.

63. The method of ANY one of the above method clauses, further comprising:
implementing a conditional notification 1070 like that of FIG. 10.

64. The method of ANY one of the above method clauses, further comprising:
implementing a scoring system to imbue an entity 10B who has requested and received a service 1050 with an accelerating evaluation of trustworthiness (concave up, as shown) as depicted in trajectory 962 of FIG. 9.

65. The method of ANY one of the above method clauses, further comprising:
implementing a scoring system to imbue a code component 630 with an evaluation of trustworthiness (e.g. quantified as a current score 855) growing with time at a rate (steepness) that depends upon a token balance 748 of an entity 10A who supplied the code component as depicted in FIGS. 11-12.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A transistor-based distributed ledger interaction method comprising:

recording one or more elements of a first version of a first smart contract privately on a first cryptographically authenticatable node residing on one or more private servers; and executing said first version of said first smart contract so as to retrieve first cryptographically authenticatable node data in a first cryptographically authenticatable node by executing said first version of said first smart contract using one or more parameters that identify both said first cryptographically authenticatable node and said first cryptographically authenticatable node data to be retrieved and so as to configure a second smart contract to include a first transaction that is partly based on said first cryptographically authenticatable node data from said first cryptographically authenticatable node and partly based on a first attribute of a distributed ledger destination and so as to implement said first transaction of said second smart contract partly based on said first cryptographically authenticatable node data from said first cryptographically authenticatable node and partly based on said distributed ledger destination, wherein said distributed ledger destination identifies a second cryptographically authenticatable node and wherein said executing said first version of said first smart contract comprises:

accepting an expenditure of a special-purpose cryptographic utility token belonging to an entity who transmitted a request for an execution of said first smart contract, wherein said expenditure is conditional upon said request being granted, wherein said special-purpose cryptographic utility token contains an embedded license term includes an embedded license term in a smart contract codifying one or more requirements that a request must fulfill as a precondition to a particular service identified by said request, said embedded license term defining a stateless smart contract initiation protocol that must be used for said request to be granted, and wherein a Representation State Transfer protocol is used as said stateless smart contract initiation protocol;

iteratively monitoring one or more public nodes for one or more requester-specified phenomena of interest, wherein said one or more requester-specified phenomena of interest include first and second asset transfers from a requester-specified digital wallet; and transmitting to one or more mining rig nodes a result of said first transaction of said second smart contract partly based on said first cryptographically authenticatable node data from said first cryptographically authenticatable node and partly based on said distributed ledger destination being implemented.

2. The transistor-based distributed ledger interaction method of claim 1, further comprising:
transmitting a result of said second contract to a cryptographically secured handheld digital wallet configured to receive at least a fraction of said special-purpose cryptographic utility token.

3. The transistor-based distributed ledger interaction method of claim 1, wherein said executing said first version of said first smart contract comprises:
iteratively monitoring one or more public nodes for one or more requester-specified phenomena of interest by iteratively executing said first transaction of said second smart contract on an ongoing basis, wherein said one or more requester-specified phenomena of interest include a transaction pertaining to a requester-specified digital wallet.

4. The transistor-based distributed ledger interaction method of claim 1, wherein said distributed ledger destination identifies said first cryptographically authenticatable node.

5. The transistor-based distributed ledger interaction method of claim 1, wherein said distributed ledger destination identifies a second cryptographically authenticatable node and wherein said second cryptographically authenticatable node comprises a blockchain node.

6. The transistor-based distributed ledger interaction method of claim 1, wherein an expenditure of at least a fraction of said special-purpose cryptographic utility token by an entity who requests a service increases a time interval until that entity obtains an eligibility.

7. The transistor-based distributed ledger interaction method of claim 1, wherein said invoking said transistor-based circuitry configured to execute said first version of said first smart contract comprises:
conditioning an execution of said first version of said first smart contract upon a first trustworthiness indication reaching an execution trust requirement, wherein a first entity is associated with said execution trust requirement upon a completion of a first temporal interval that depends upon a utility token balance of said first entity during said first temporal interval.

8. The transistor-based distributed ledger interaction method of claim 1, wherein said transistor-based circuitry configured to execute said first version of said first smart contract comprises:
conditioning an execution of said first version of said first smart contract upon a first trustworthiness indication reaching a threshold value, wherein a first entity is associated with an execution trust requirement in a first temporal interval having a duration that is negatively correlated with a cryptographic token balance of said first entity during said first temporal interval.

9. The transistor-based distributed ledger interaction method of claim 1, wherein one or more instances of application-type code components are configured to be initiated only by an expenditure of at least a fraction of said special-purpose cryptographic utility token.

10. The transistor-based distributed ledger interaction method of claim 1, wherein said one or more private servers are configured so that an execution of one or more instances of code components is impossible for a particular user to initiate directly through any cryptocurrency but in which said particular user can initiate an execution of at least one of said one or more code components by expending at least a fraction of said special-purpose cryptographic utility token.

11. The transistor-based distributed ledger interaction method of claim 1, wherein said one or more elements of said first version of said first smart contract comprise a movement of one or more special-purpose cryptographic utility tokens and wherein said one or more elements of said first version of said first smart contract are recorded privately insofar that said first cryptographically authenticatable node and said first cryptographically authenticatable node are separated by a firewall.

12. The transistor-based distributed ledger interaction method of claim 1, wherein said executing said first version of said first smart contract causes one or more processors to transmit said first transaction of said second smart contract to said second cryptographically authenticatable node, wherein said first cryptographically authenticatable node data includes a first termset version identifier and wherein said prior cryptographically authenticatable node data includes a prior termset version identifier.

13. The transistor-based distributed ledger interaction method of claim 1, wherein said distributed ledger destination implements a serverless architecture blockchain platform.

14. A transistor-based distributed ledger interaction system comprising:
one or more processors couple to a memory executing the following means;
means for recording one or more elements of a first version of a first smart contract privately on a first cryptographically authenticatable node; and
means for executing said first version of said first smart contract so as to retrieve first cryptographically authenticatable node data in a first cryptographically authenticatable node by executing said first version of said first smart contract using one or more parameters that identify both said first cryptographically authenticatable node and said first cryptographically authenticatable node data to be retrieved and so as to configure a second smart contract to include a first transaction that is partly based on said first cryptographically authenticatable node data from said first cryptographically authenticatable node and partly based on a first attribute of a distributed ledger destination and so as to implement said first transaction of said second smart contract partly based on said first cryptographically authenticatable node data from said first cryptographically authenticatable node and partly based on said distributed ledger destination.

15. A non-transitory computer readable medium comprising:
one or more instructions stored thereon that, when executed by one or more processors, cause the one or more processors to execute a transistor-based distributed ledger interaction method comprising:
recording one or more elements of a first version of a first smart contract privately on a first cryptographically authenticatable node residing on one or more private servers; and
executing said first version of said first smart contract so as to retrieve first cryptographically authenticatable node data in a first cryptographically authenticatable node by executing said first version of said first smart contract using one or more parameters that identify both said first cryptographically authenticatable node and said first cryptographically authenticatable node data to be retrieved and so as to configure a second smart contract to include a first transaction that is partly based on said first cryptographically authenticatable node data from said first cryptographically authenticatable node and partly based on a first attribute of a distributed ledger destination and so as to implement said first transaction of said second smart contract partly based on said first cryptographically authenticatable node data from said first cryptographically authenticatable node and partly based on said distributed ledger destination, wherein said distributed ledger destination identifies a second cryptographically authenticatable node and wherein said executing said first version of said first smart contract comprises:

accepting an expenditure of a special-purpose cryptographic utility token belonging to an entity who transmitted a request for an execution of said first smart contract, wherein said expenditure is conditional upon said request being granted, wherein said special-purpose cryptographic utility token contains an embedded license term includes an embedded license term in a smart contract codifying one or more requirements that a request must fulfill as a precondition to a particular service identified by said request, said embedded license term defining a stateless smart contract initiation protocol that must be used for said request to be granted, and wherein a Representation State Transfer protocol is used as said stateless smart contract initiation protocol;

iteratively monitoring one or more public nodes for one or more requester-specified phenomena of interest, wherein said one or more requester-specified phenomena of interest include first and second asset transfers from a requester-specified digital wallet; and transmitting to one or more mining rig nodes a result of said first transaction of said second smart contract partly based on said first cryptographically authenticatable node data from said first cryptographically authenticatable node and partly based on said distributed ledger destination being implemented.

16. The non-transitory computer readable medium of claim 15, wherein said first cryptographically authenticatable node resides on one or more private servers configured and wherein said non-transitory computer readable medium is configured so that an execution of one or more instances of code components is impossible for a particular user to initiate directly through any cryptocurrency but in which said particular user can initiate an execution of at least one of said one or more code components by expending at least a fraction of said special-purpose cryptographic utility token.

17. The non-transitory computer readable medium of claim 15, wherein said non-transitory computer readable medium is configured so that said executing said first version of said first smart contract in said method causes a transmission of said first transaction of said second smart contract to said second cryptographically authenticatable node, wherein said first cryptographically authenticatable node data includes a first termset version identifier and wherein said prior cryptographically authenticatable node data includes a prior termset version identifier.

\* \* \* \* \*

UNITED STATES PATENT AND TRADEMARK OFFICE
CERTIFICATE OF CORRECTION

PATENT NO. : 10,135,607 B1  
APPLICATION NO. : 16/101343  
DATED : November 20, 2018  
INVENTOR(S) : Joe Roets Page 1 of 1

It is certified that error appears in the above-identified patent and that said Letters Patent is hereby corrected as shown below:

In the Claims

At Column 22 Lines 53-54 and at Column 25 Lines 24-25 please delete "includes an embedded license term" (of Claims 1 and 17).

Signed and Sealed this
Ninth Day of April, 2019

Andrei Iancu
*Director of the United States Patent and Trademark Office*